US010244360B2

(12) United States Patent
Bhatti et al.

(10) Patent No.: US 10,244,360 B2
(45) Date of Patent: Mar. 26, 2019

(54) DETERMINING LOCATION OF MOBILE DEVICE USING SENSOR SPACE TO PHYSICAL SPACE MAPPING

(71) Applicant: Apple Inc., Cupertino, CA (US)

(72) Inventors: Jahshan A. Bhatti, San Jose, CA (US); Brent M. Ledvina, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 238 days.

(21) Appl. No.: 15/258,963

(22) Filed: Sep. 7, 2016

(65) Prior Publication Data

US 2017/0359697 A1 Dec. 14, 2017

Related U.S. Application Data

(60) Provisional application No. 62/349,009, filed on Jun. 12, 2016.

(51) Int. Cl.
*G01S 5/14* (2006.01)
*G01S 5/02* (2010.01)
(Continued)

(52) U.S. Cl.
CPC ............ *H04W 4/04* (2013.01); *G01S 5/0278* (2013.01); *G01S 5/14* (2013.01); *H04W 4/043* (2013.01); *G01S 5/0252* (2013.01); *H04W 4/021* (2013.01)

(58) Field of Classification Search
None
See application file for complete search history.

(56) References Cited

U.S. PATENT DOCUMENTS 6,323,807 B1 11/2001 Golding et al.
6,992,625 B1 1/2006 Platt et al.
(Continued)

FOREIGN PATENT DOCUMENTS

WO 2016083937 6/2016

OTHER PUBLICATIONS

Liu et al., "Survey of Wireless Indoor Positioning Techniques and Systems" IEEE Transactions on Systems, Man, and Cybernetics—Part C: Applications and Reviews, vol. 37, No. 6, Nov. 2007.*
(Continued)

*Primary Examiner* — John C Kuan
(74) *Attorney, Agent, or Firm* — Kilpatrick Townsend and Stockton LLP

(57) ABSTRACT

A mobile device can identify its physical location without explicit knowledge of physical coordinates, but instead using sensor measurements dependence on distance, e.g., signal strength from a Wi-Fi router. Sensor measurements can be used to determine the mobile device is at a same physical location as a previous measurement. For example, numerous measurements of sensor values can form data points that are clustered in sensor space, where a cluster of data points in sensor space corresponds to a physical cluster of physical positions in physical space. A current physical location of the mobile device can be determined by identifying which cluster of sensor positions the current measurements correspond. To identify the cluster of sensor positions, a probability can be determined for each cluster based on a sensor distance between the current measurement and a representative data point of the cluster and a kernel function.

20 Claims, 16 Drawing Sheets

(51) Int. Cl.
*H04W 4/021* (2018.01)
*H04W 4/04* (2009.01)

(56) References Cited

U.S. PATENT DOCUMENTS

| | | | |
|---|---|---|---|
| 7,406,116 | B2 | 7/2008 | Agrawala et al. |
| 8,385,943 | B1* | 2/2013 | Han .................. H04W 4/043 |
| | | | 455/456.1 |
| 9,113,300 | B2 | 8/2015 | Marti et al. |
| 9,253,605 | B2 | 2/2016 | Alizadeh-Shabdiz |
| 2006/0087425 | A1* | 4/2006 | Haeberlen ............ G01S 5/0252 |
| | | | 340/539.13 |
| 2013/0122935 | A1 | 5/2013 | Das et al. |
| 2013/0252637 | A1 | 9/2013 | Cha et al. |
| 2013/0300607 | A1* | 11/2013 | Mansour .............. G01S 5/0252 |
| | | | 342/451 |
| 2013/0316734 | A1 | 11/2013 | Weiss |
| 2013/0325856 | A1 | 12/2013 | Soto et al. |
| 2014/0106773 | A1* | 4/2014 | Li ....................... H04W 4/043 |
| | | | 455/456.1 |
| 2014/0171114 | A1 | 6/2014 | Marti et al. |
| 2014/0213298 | A1 | 7/2014 | Marti et al. |
| 2015/0035084 | A1 | 2/2015 | Ni et al. |
| 2015/0350841 | A1 | 12/2015 | Dal Santo et al. |
| 2016/0165566 | A1 | 6/2016 | Jung |
| 2017/0006430 | A1 | 1/2017 | Chao et al. |
| 2017/0272181 | A1 | 9/2017 | Gudi et al. |

OTHER PUBLICATIONS

Kushki et al., "Kernel-Based Positioning in Wireless Local Area Networks" IEEE Transactions on Mobile Computing, vol. 6, No. 6, Jun. 2007.*
Kaemarungsi et al., "Modeling of Indoor Positioning Systems Based on Location Fingerprinting" IEEE 2004.*
Bhatti et al., ""Characterizing MicroLocation Clustering Performance"", Jan. 11, 2016, 3 pages.
Do et al., "Where and what: Using smartphones to predict next locations and applications in daily life", Pervasive and Mobile Computing, vol. 12, Jan. 1, 2014, pp. 79-91.
PCT/US2017/034664 , "International Search Report and Written Opinion", dated Aug. 25, 2017, 13 pages.
Xu et al., "Preference, Context and Communities: A Multi-faceted Approach to Predicting Smartphone App Usage Patterns", Proceedings of the 17th Annual International Symposium on International Symposium on Wearable Computers, Jan. 1, 2013, pp. 69-76.
U.S. Appl. No. 15/272,394, "First Action Interview Office Action," dated Aug. 24, 2017, 4 pages.
PCT/US2017/034665, "International Search Report and Written Opinion," dated Aug. 30, 2017, 13 pages.

* cited by examiner

DETERMINING LOCATION OF MOBILE DEVICE USING SENSOR SPACE TO PHYSICAL SPACE MAPPING

CROSS-REFERENCES TO RELATED APPLICATIONS

This application claims priority to U.S. Provisional Patent Application No. 62/349,009, filed on Jun. 12, 2016, and titled "Determining Location of Mobile Device Using Sensor Space to Physical Space Mapping," the disclosure of which is hereby incorporated by reference in its entirety for all purposes.

BACKGROUND

Modern mobile devices (e.g., smartphones) are capable of determining its geographical position by referencing the device's GPS coordinates. Referencing GPS coordinates to determine a location of a device, however, limits the resolution at which the device can determine its position. Furthermore, GPS service requires an established communication line with GPS satellites. If the connection between the device and the GPS satellites is severed, the device will be unable to receive GPS coordinates, and thus be unable to determine its location, as may occur in a building.

In addition to using GPS coordinates, some modern mobile devices also request an input from a user pertaining to location information. Floor plans, surveys, and the like can be entered into the device so that the device knows the general layout of the indoor location. However, inputting this information requires a survey to be performed, or requires a user to acquire a floor plan of the indoor location, which can be a hassle and difficult to do, especially when the user does not have means to perform a survey or have access to the floor plan.

Thus, improvements to determining position in indoor locations are desired.

SUMMARY

Embodiments provide improved mobile devices and methods for determining that the mobile device is positioned in a physical location of physical space. The positioning determination may be made without explicit knowledge of the specific physical coordinates of the mobile device, but instead use sensor measurements, e.g., from Wi-Fi routers that are stationary. For example, these sensor measurements may be repeatable, in that measurements made at different times, but from a same physical location (e.g., within a few feet), will be roughly the same. Over time, numerous measurements of sensor values can form data points (sensor positions) that are clustered in sensor space (i.e., space of various sensor measurements), where a cluster of sensor positions in sensor space corresponds to a physical cluster (physical location or location region) of physical positions in physical space.

In some embodiments, a current physical location of the mobile device can be determined by identifying which cluster of sensor positions the current measurements correspond. To identify the cluster of sensor positions, a probability can be determined for each cluster based on a sensor distance between the current measurement and a representative data point of the cluster and a kernel function, which may be defined based on typical sizes of physical locations within which a user interacts with the mobile device, e.g., a size of a kitchen, area of a couch, or a bed.

In some embodiments, the sensor distance may be mapped to a physical distance as part of determining the probability. Accordingly, the probability of the mobile device being in a physical location may be determined based on a physical distance between a representative position near the center of the physical location (cluster of physical positions) and a current physical position of the mobile device. The physical distance may be calculated from a sensor distance determined by the mobile device based on sensor measurements in sensor space. Determining a physical distance from a sensor distance can allow the mobile device to determine a probability of the mobile device being in an identifiable physical location by referencing sensor measurements, without knowing the actual physical coordinates of the mobile device.

As an example, at a given physical position, a mobile device may be configured to measure a sensor position defined by a set of one or more sensor values, e.g., measurements of signal intensity or time-of-flight for wireless signals from one or more signal sources, such as a wireless router. Using this sensor position, the mobile device may determine a sensor distance between its current sensor position and a representative sensor position of a cluster corresponding to a physical location in physical space. This sensor distance may be converted to a physical distance by applying a distance function (e.g., a calibrated function that converts between sensor distance and physical distance) to the sensor distance. The physical distance may then be used to determine a probability of the mobile device being within the physical location represented by the representative sensor position of the cluster. If a probability of the mobile device being in the physical location is greater than a probability threshold, then the mobile device may determine that it is within the physical location.

Other embodiments are directed to systems, portable consumer devices, and computer readable media associated with methods described herein.

A better understanding of the nature and advantages of embodiments of the present disclosure may be gained with reference to the following detailed description and the accompanying drawings.

DETAILED DESCRIPTION

Figure 1A:
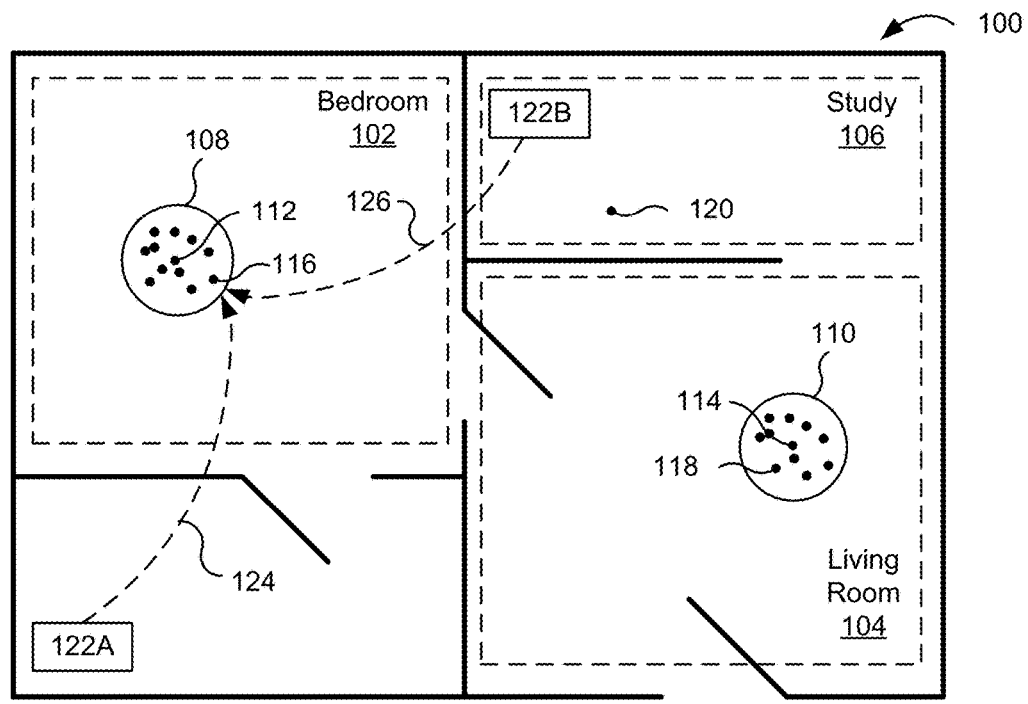
FIG. 1A is a simplified diagram illustrating an exemplary floor plan in physical space with identified physical locations, according to embodiments of the present disclosure.

Determining a physical position of a mobile device within a home or other building with high accuracy and fine spatial resolution can be difficult for typical mobile devices, which primarily determine their physical position from latitude and longitude measurements. Embodiments provide techniques to enable mobile devices to determine its physical position with high accuracy and fine spatial resolution without the use of latitude and longitude measurements, and determine whether its physical position is within an identifiable physical location. Sensor(s) on the mobile device can measure sensor values from wireless signals emitted by one or more signal sources that are essentially stationary, e.g., a wireless router in the home that rarely moves. These sensor values are reproducible at a same physical position of the mobile device, thus the sensor values can be used as a proxy for physical position. In this manner, the sensor values can form a sensor position, although in sensor space, as opposed to physical space. A sensor position may be a multi-dimensional data point defined by a separate sensor value for each dimension.

Through continued use, a mobile device may store numerous sensor positions, each captured at different instances in time and at different physical positions. These sensor positions may be analyzed to generate clusters of sensor positions periodically at night or other time of non-usage of the mobile device. Groups of sensor positions having similar sensor values may form a cluster of sensor positions, where each cluster of sensor positions corresponds with a physical location at which the mobile device is often used. Further detail with respect to how the mobile device measures sensor values and determines clusters of sensor positions (i.e., multi-dimensional data points) may be referenced in U.S. patent application Ser. No. 15/272,391, filed on Sep 21, 2016, entitled "Proactive Actions on Mobile Device Using Uniquely-Identifiable and Unlabeled Locations," which is herein incorporated by reference in its entirety for all purposes.

After the cluster of sensor positions are generated (e.g., the next day), the mobile device can perform a new measurement to obtain a sensor position corresponding to the mobile device's current physical position, and use that newly measured sensor position to calculate a probability of the mobile device being within one of the generated clusters of sensor positions. To calculate the probability, the mobile device may determine a sensor distance between the newly measured sensor position and a representative sensor position of each cluster of sensor positions. The representative sensor position may be near the center of each respective cluster of sensor positions.

The sensor distance can be used as an input to a kernel function that relates distance to a probability. Kernel functions can exist in sensor space or physical space, with the two kernel functions (e.g., the kernel function in sensor space and the kernel function in physical space) being related based on a distance function between sensor distance and physical distance. A distance function is a conversion function between physical distance and sensor distance. The distance function may be determined using a calibration process that involves sensor measurements at known separated distance to determine a relationship between changes in sensor values and physical distance. The distribution of a kernel function in sensor space can be defined based on typical sizes of areas within which a user has heavy usage of the mobile device, e.g., on a couch or on a bed.

When a kernel function in physical space is used, a sensor distance can be converted to a physical distance using the distance function. The physical distances may then be used to calculate a probability of being within each cluster of sensor positions using a kernel function in physical space that decays at a rate consistent with typical sizes of areas that a user has high usage of the mobile device. A probability of being in a certain physical location that is greater than a probability threshold can indicate that the mobile device is positioned within that physical location. Thus, the mobile device can determine within which physical location it is positioned.

I. Determining a Physical Location of a Mobile Device

According to embodiments, a mobile device can determine whether it is in a previously identified physical location based on sensor measurements. A physical location may be an area in physical space where a user frequently uses a mobile device. Measurements of sensor values (e.g., intensity values from networking devices) at a same physical location will be similar to each other across measurements taken at different times. In this manner, when the mobile device returns to a same physical location, it can be determined based on the sensor measurements being similar to previous measurements.

A. Physical Space and Sensor Space

FIG. 1A illustrates an exemplary floor plan in physical space 100 having a bedroom 102, living room 104, and a study 106. A user may often use his or her mobile device when the user is in bed or when the user is sitting on his or her couch. Thus, there may be a physical location around the user's bed (e.g., physical location 108) and another physical location around the user's couch (e.g., physical location 110). Each physical location may be an area of physical space that encompasses multiple physical positions (e.g., just a foot or two away from each other) that are clustered together. Each physical position represents a position where the mobile device was used by a user. A determination of use of the mobile device may be determined in response to a triggering event at the mobile device, e.g., a button press, as will be discussed further herein.

When the mobile device is used, the mobile device may detect one or more signals emitted from one or more signal sources (e.g., signal sources 122A and 122B) that are essentially stationary, such as wireless routers, Bluetooth devices, smart home entertainment systems, smart home appliances, network enabled devices, vocally-interactive devices, and the like. As part of detecting signals at any of the physical positions using sensor(s) of the mobile device, the mobile device may measure one or more sensor values from signals emitted from signal sources 122A and 122B. For instance, if the mobile device is at physical position 116, the mobile device may measure sensor values from signal 124 emitted from signal source 122A and signal 126 from signal source 122B. The measured sensor values may be signal properties of signal 124 and signal 126. Examples of signal properties include received signal strength indication (RSSI) and time-of-flight (TOF) measurement values. The measured sensor values may be used to form a sensor position in sensor space, as shown in FIG. 1B.

Figure 1B:
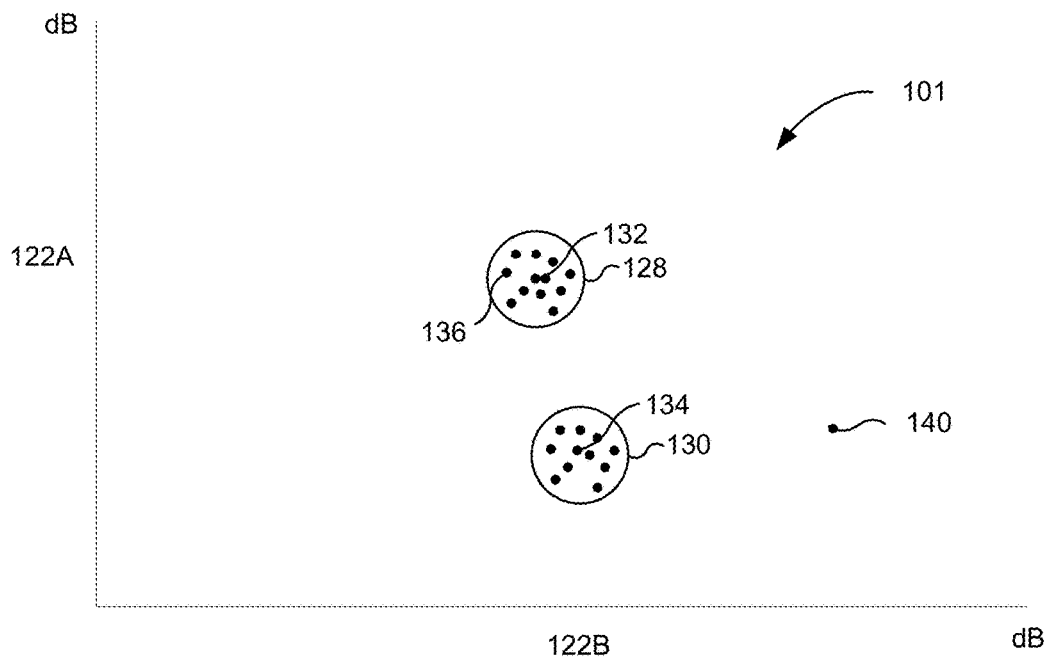
FIG. 1B is a simplified diagram illustrating an exemplary chart in sensor space corresponding to the exemplary floor plan in physical space of FIG. 1A, according to embodiments of the present disclosure.

FIG. 1B is a simplified diagram illustrating a plurality of sensor positions in sensor space 101, which corresponds to physical space 100. Sensor space 101 is depicted as a plot of measured sensor positions in signal strength. The X axis may represent measured values of signals from signal source 122B in dB increasing to the right, and the Y axis may represent measured values of signals from signal source 122A in dB increasing upwards.

A sensor position can correspond to a set of one or more sensor values measured by sensor(s) of a mobile device at a physical position in physical space from one or more wireless signals emitted by one or more signal sources (e.g., external devices such as networking devices). A sensor value can be a measure of a signal property, e.g., signal strength, time-of-flight, or data conveyed in a wireless signal, as may occur if a signal source measures a signal property from the mobile device and sends that value back to the mobile device. Each sensor value of a set can correspond to a different dimension in sensor space, where the set of one or more sensor values forms a data point (e.g., a multi-dimensional data point, also called a feature vector) in the sensor space. In some embodiments, the clustering can involve fewer dimensions than the full sensor space. For example, embodiments can map a high-dimensional point to a reduced space (e.g. 2-D for visualization). Popular techniques for such mapping are Principal Components Analysis and Multidimensional Scaling. The 2-D visualization may be used for inferring structure such as connectivity of the physical space (e.g. a graph representation of the floor plan).

The sensor positions in sensor space 101 correspond to respective physical positions in physical space 100. For example, measured sensor values at physical position 116 in FIG. 1A corresponds to a sensor position 136 in sensor space shown in FIG. 1B. Sensor position 136 is represented as a two-dimensional data point, where one dimension corresponds to a sensor value from signal source 122A and the other dimension corresponds to a sensor value from signal source 122B. Sensor space 101 may include sensor locations, e.g., sensor location 128 and sensor location 130, each corresponding to a cluster of sensor positions. A cluster of sensor positions can correspond to a group of sensor positions that are near each other in sensor space. For example, the sensor positions of a cluster can have data points that are within a threshold distance of each other or from a centroid of a cluster. Sensor positions of a cluster in sensor space would typically have their corresponding physical positions form a cluster in physical space. Thus, sensor locations 128 and 130 may correspond with physical locations 108 and 110 in FIG. 1A, respectively Sensor locations 128 and 130 (e.g., clusters of sensor positions) and their corresponding physical locations 108 and 110 may be unlabeled locations, meaning the mobile device does not know the actual physical coordinates corresponding to physical locations 108 and 110. The device may only know that there exists a cluster of sensor positions that have similar sensor values and that the cluster represents a discrete location in physical space. However, the mobile device may perform functions based on sensor positions in sensor space such that use of the mobile device in physical space is benefited. For instance, the mobile device may determine a probability of it being within a physical location based on its sensor position, and then perform automated process based on historical usage of the mobile device. For example, the mobile device can provide suggested application(s) to a user based on the application being used a high proportion of the time at the physical location. As another example, the mobile device can send a control signal to another application or another device, e.g., to turn on lights, change a thermostat, or open a garage door, based on previous usage at that physical location.

Each sensor location may be represented by a sensor position near the center of the sensor location. For instance, sensor location 128 may have a representative sensor position 132, and sensor location 130 may have a representative sensor position 134. The representative sensor position may be an average of all sensor positions within the sensor location. Representative sensor positions in sensor space 101 may correspond with representative physical positions in physical space 100. As an example, representative sensor position 132 may correspond with representative physical position 112, and representative sensor position 134 may correspond with representative physical position 114.

The mobile device can use the representative sensor positions of each sensor location to determine the probability of the mobile device being located within a physical location. As an example, the mobile device can determine its current sensor position and determine a sensor distance between its current sensor position and each representative sensor position of known sensor locations, e.g., representative sensor positions 132 and 134 of sensor locations 128 and 130, respectively. The mobile device may then convert the sensor distance to a physical distance by using a distance function, as will be discussed further herein. The physical distance may be used to determine a probability of the mobile device being in any one of the physical locations using a kernel function in physical space, e.g., a Gaussian function centered at representative physical position 112 for determining the probability of being in physical locations 108. Shorter distances between the current location of the mobile device and a representative physical location of a known physical location would correspond to a higher probability of being in the known physical location, and vice versa.

As an example, if the mobile device is at physical position 116, the mobile device may determine that the physical distance between physical position 116 and representative physical position 112 is very short and thus calculate a high probability of being within physical location 108, where the physical distance is determined using a corresponding sensor distance and the distance function. The mobile device may also determine that the distance between physical position 116 and representative physical position 114 of physical location 110 is very long, and thus calculate a low probability of being within physical location 110. Along similar lines, if the mobile device is at physical position 118, it may calculate a high probability of being in physical location 110 and a low probability of being in physical location 108; and if the mobile device is at physical position 120 (e.g., corresponding to sensor position 140 shown in FIG. 1B), it may calculate a low probability of being in both physical location 110 and physical location 108.

In other embodiments, a kernel function in sensor space can be used. For example, a Gaussian function can be centered at representative sensor position 132 as a kernel functions for sensor location 128. The sensor distance of sensor position 136 from representative sensor position 132 can be used directly with the kernel function in sensor space to determine a probability of being in the corresponding physical location. The parameters of the kernel function can be determined based on properties of kernel functions in physical space, e.g., physical diameter of physical locations, such as physical locations 108 and 110, as well as based on the distance function for transforming such physical distances to sensor distances. A kernel function in sensor space may not be symmetric, e.g., if the distance function is non-linear.

B. Overview for Determining Physical Location

Figure 2:
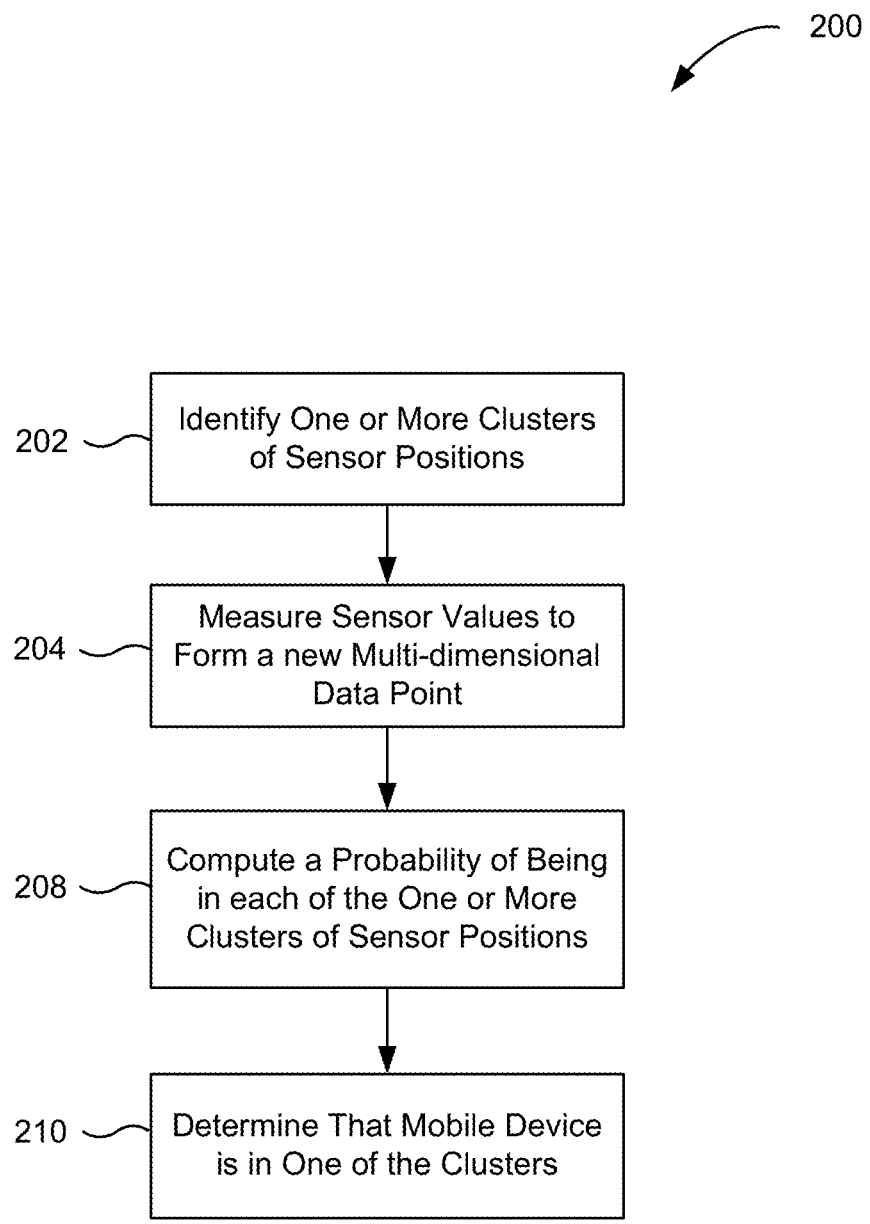
FIG. 2 is a flow chart for a method of determining a location of a mobile device with respect to previously identified physical locations, according to embodiments of the present disclosure.

FIG. 2 is a flow chart for a method 200 of determining a location of a mobile device with respect to previously identified physical locations, according to embodiments of the present disclosure. Method 200 can be performed by a mobile device, e.g., a phone, tablet, and the like. The physical locations can be previously identified based on previous sensor measurements at physical positions within the physical locations.

At block 202, one or more clusters of sensor positions are identified. For instance, the mobile device may access a database to obtain clusters of sensor positions, e.g., corresponding to a location region of the mobile device. A location region (e.g., a home) can be determined using standard location techniques, e.g., GPS. The clusters of sensor positions may represent sensor locations, e.g., sensor locations 128 and 130 in FIG. 1B, that correspond with physical locations, e.g., physical locations 108 and 110, in physical space. In some embodiments, the boundaries of the corresponding physical locations may be defined by a kernel function, which may be a probability distribution function having a specific width and decay. A probability threshold can define a boundary of a cluster, as will be discussed further herein. Each physical location may be centered around a representative physical position corresponding to a representative sensor position, which may be near the center of a respective cluster of sensor positions.

At block 204, the mobile device measures new sensor values to obtain a new sensor position in the form of a multi-dimensional data point representing the current physical position of the mobile device. For instance, the mobile device may measure sensor values of signals emitted from signal sources within the general vicinity. In some embodiments, the new sensor position may be obtained in the form of a single-dimensional data point when one sensor value is measured. The mobile device may measure new sensor values upon detecting a triggering event at an input device of the mobile device.

A triggering event can be identified as an event sufficiently likely to correlate to an operation of the mobile device. A triggering event can be caused by a user and/or an external device. For instance, the triggering event can be a specific interaction of the user with the mobile device. Examples of triggering events are application launches, voice commands (e.g., to initiate at voice assistant to perform searching or other activity with an application), and a first interaction of the day. As other examples, a triggering event can be when an accessory device is connected to the mobile device, e.g., inserting headphones into a headphone jack, making a Bluetooth connection, and the like. A list of events that are triggering events can be stored on the mobile device. Such events can be a default list and be maintained as part of an operating system, and may or may not be configurable by a user.

At block 208, a probability of the mobile device being in each of one or more of the physical locations are calculated. As a reminder, the specific coordinates do not need to be known for a physical location, just that it can be identified when a mobile device has returned to a previous location for which sensor measurements have been previously obtained. The probability may be determined by calculating a sensor distance between its current sensor position and each representative sensor position of the clusters of sensor positions. A larger sensor distance would indicate a lower probability. In some embodiments, the sensor distance can be converted to a physical distance by using a distance function, and then a probability of the mobile device being in any one of the physical locations can be determined using a kernel function in physical space. In other embodiments, the sensor distance can be used directed with a kernel function in sensor space, which has been defined based on the distance function.

At block 210, it may be determined whether the mobile device is in a physical location. For instance, it may be determined whether the physical position in physical space corresponding to the new multi-dimensional data point in sensor space is in physical location 108, in physical location 110, or not in any known physical location. In embodiments, determining whether the mobile device is in a physical location may be performed by comparing the probability of being in any one of the known physical locations to a probability threshold. If the probability of being in one physical location is greater than the probability threshold, then it can be determined that the physical position corresponding to the multi-dimensional data point is within that physical location.

As an example, if the current physical position of the mobile device has a probability of being within physical location 108 that is greater than the probability threshold, it may be determined that the mobile device's current physical location is physical location 108 (e.g., physical position 116). Likewise, if the current physical position of the mobile device has a probability of being within physical location 108 and a probability of being within physical location 110 that are both lower than the probability threshold, then it can be determined that the mobile device is not within any of physical locations 108 or 110 (e.g., physical position 120). If more than two probabilities are greater than the threshold, the physical location with the higher probability can be selected. Such a selection of the physical location with the higher probability can have its constraints, e.g., that the highest probability is sufficiently higher (in absolute units or as a percentage) than the second highest probability.

Method 200 discussed herein may enable a mobile device to determine whether the mobile device is in a physical location (e.g., corresponding to a known cluster of multi-dimensional data points). This determination can be an unsupervised determination, e.g., without the need for a user to input information regarding physical locations within a physical space. Having the device be able to determine whether it is in a physical location allows the mobile device to be more user friendly and have a deeper connection with the user.

II. Kernel Functions and Distance Functions

A kernel function is a probability distribution function for determining the probability of a position of a mobile device being located within a physical location. The kernel function may have a peak probability at a center point and gradually decreasing probabilities farther away from that center point. In some embodiments, the kernel function may be a normal distribution, such as a Gaussian distribution. According to embodiments herein, there may be two types of kernel functions: a kernel function in sensor space and a kernel function in physical space. A distance function may be used to convert between sensor space and physical space, as will be discussed further herein.

A. Kernel Function in Physical Space

In embodiments, a kernel function in physical space may be a probability distribution function having a width defined by a physical distance. For instance, FIG. 3 is a chart 300 illustrating an exemplary kernel function 301 in physical space, according to embodiments of the present disclosure. Chart 300 may have an X axis representing distance D and a Y axis representing probability P ranging from 0 to 1. Distance D may be in any suitable units, such as feet, meters, yards, and the like.

Kernel function 301 may be centered at a point 302 where the probability P is at its highest. In embodiments, point 302 may be a representative physical position corresponding to a representative multi-dimensional data point of a cluster of multi-dimensional data points. Point 302 may be the representative physical position because the representative multi-dimensional data point to which the representative physical position corresponds may be near the center of the cluster, e.g., when the representative multi-dimensional data point is an average of all the multi-dimensional data points within the cluster. Thus, kernel function 301 may accurately represent the probability of being in the cluster defined by the representative multi-dimensional data point.

Figure 3A:
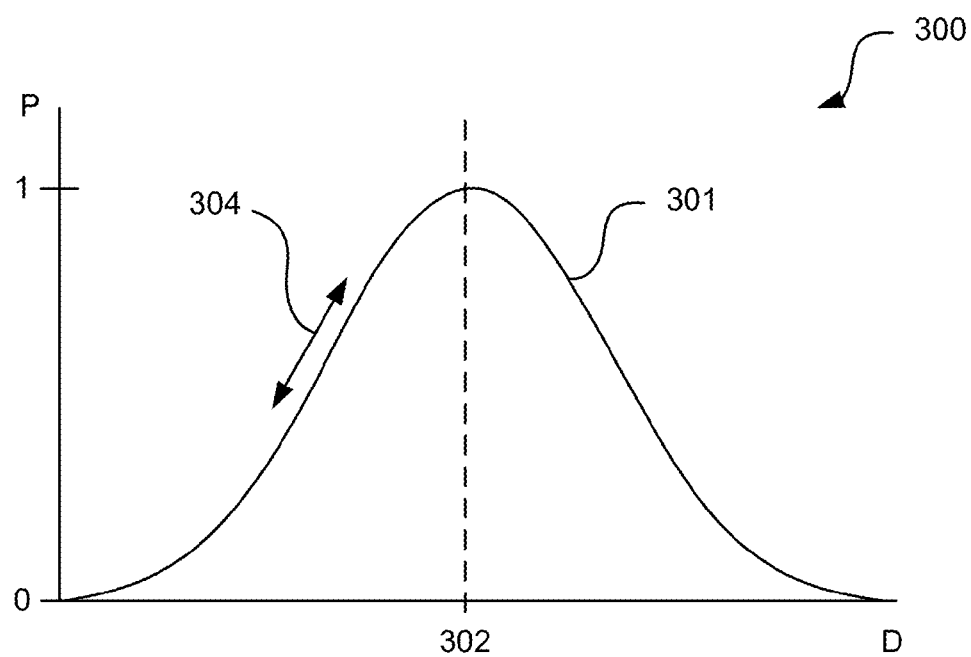
FIGS. 3A and 3B are graphs with plotted exemplary kernel functions in physical space, according to embodiments of the present disclosure.

As further shown in FIG. 3A, kernel function 301 in physical space may have a gradually decreasing probability as the mobile device moves farther away from point 302. This decreasing probability may be known as a decay 304, which may represent the general rate of decrease in probability. A larger decay 304 indicates that the probability decreases faster as the mobile device moves farther away from point 302. Likewise, a smaller decay 304 indicates that the probability decreases slower as the mobile device moves farther away from point 302. According to embodiments, when kernel function 301 is centered at a representative physical position corresponding to a representative multi-dimensional data point for a cluster of multi-dimensional data points, the kernel function 301 represents the probability of a new physical position being within a physical location, where the physical location corresponds to the cluster of multi-dimensional data points. Thus, new physical positions closer to point 302 may have higher probabilities of being within the physical location than physical positions farther away from point 302.

In some embodiments, kernel function 301 may be defined to have non-zero values that extend to infinity or drop to zero at a particular distance, which may be achieved by adding a step function to a normal distribution. The distance at which the kernel function drops to zero can correspond to the probability threshold.

Figure 3B:
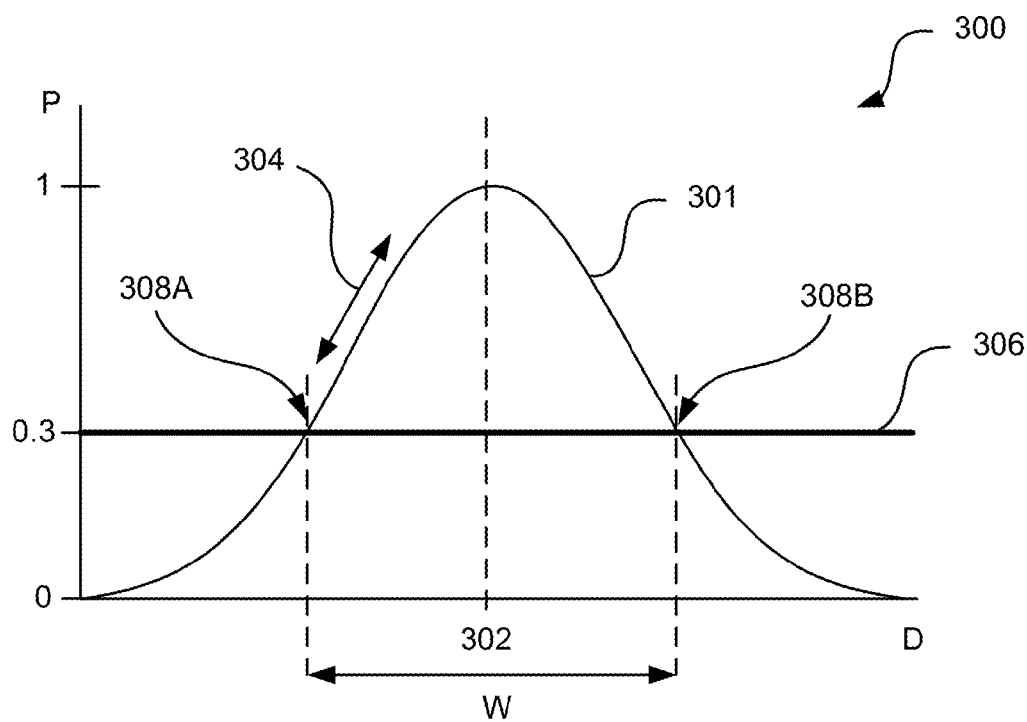

FIG. 3B illustrates kernel function 301 having boundaries established by a probability threshold 306 such that its width W is defined by probability threshold 306. The probability threshold may be a probability that defines whether a new physical position is within a physical location, or outside of a physical location. For instance, new physical positions determined to have a distance between intersection points 308A and 308B have a high probability of being within the physical location represented by kernel function 301. In embodiments, both kernel function 301 and probability threshold 306 define a physical location, e.g., physical location 108 and physical location 110 in FIG. 1A discussed herein. Thus, probability threshold 306 may define the boundaries of kernel function 301 for a physical location corresponding to a cluster of multi-dimensional data points.

B. Calibration of Kernel Functions in Physical Space

Given that the width and the decay of a kernel function and a corresponding probability threshold can define the probability of being in a physical location, the size of the physical location depends on these parameters as well. Larger widths and lower decay results in larger sized physical locations. Likewise, lower threshold values may also result in larger sized physical locations. Accordingly, the size of the kernel function may be adjusted according to design.

For instance, a kernel function as a Gaussian distribution may be defined by:

$$K(d) = \exp\left(-\frac{d^2}{2\sigma^2}\right)$$

where the width and decay of the kernel function may be adjusted by changing the exponent for variable d or changing the value for $\sigma$. Although embodiments herein disclose the kernel function as a Gaussian distribution, any other suitable distribution may be used for the kernel function. For instance, the kernel function may be a uniform kernel that may be defined by:

$$K(d) = \begin{cases} 1 & d < D \\ 0 & \text{otherwise} \end{cases}$$

where D is the physical extent of each physical location. In another instance, the kernel function may be a Laplacian kernel that may be defined by:

$$K(d) = \exp\left(-\frac{d}{\sigma}\right)$$

In embodiments, the size of the kernel function may be selected based upon the size of an amount of space determined by typical human behavior at a location. For instance, a user in bed would not typically move outside a radial distance of approximately 2 to 4 meters.
Similarly, a user on a couch would also not typically move outside a radial distance of approximately 2 to 4 meters. Thus, the size of the kernel function in physical space may be configured to be approximately 2 to 4 meters, preferably 3 meters wide. In embodiments, the width and decay as well as the probability threshold may be calibrated during manufacturing of the electronic device as a default setting.

In other embodiments, the size of the kernel function may be selected based on the distance where signal strength decorrelates from one location to another, e.g., when a measured signal strength stops being correlated with one location, while beginning to be correlated with another location. In some embodiments, the decorrelation may be about 5 to 6 meters of linear distance for power. Thus, the size of the kernel function may be half of that distance, e.g., 3 to 4 meters wide. This calibration may be enhanced with one or more sensors built in the mobile device. For instance, a gyroscope, an accelerometer, a compass, and the like that are installed in the mobile phone can be used to determine the amount of distance traveled when determining correlation of signal strength. Methods such as Pedestrian Dead Reckoning (PDR) may be used to determine the physical distance traveled. Details of this method may be referenced in the publication entitled "Robust pedestrian dead reckoning (R-PDR) for arbitrary mobile device placement," published in the 2014 International Conference on Indoor Positioning and Indoor Navigation on the 27of Oct 2014.

Figure 3C:
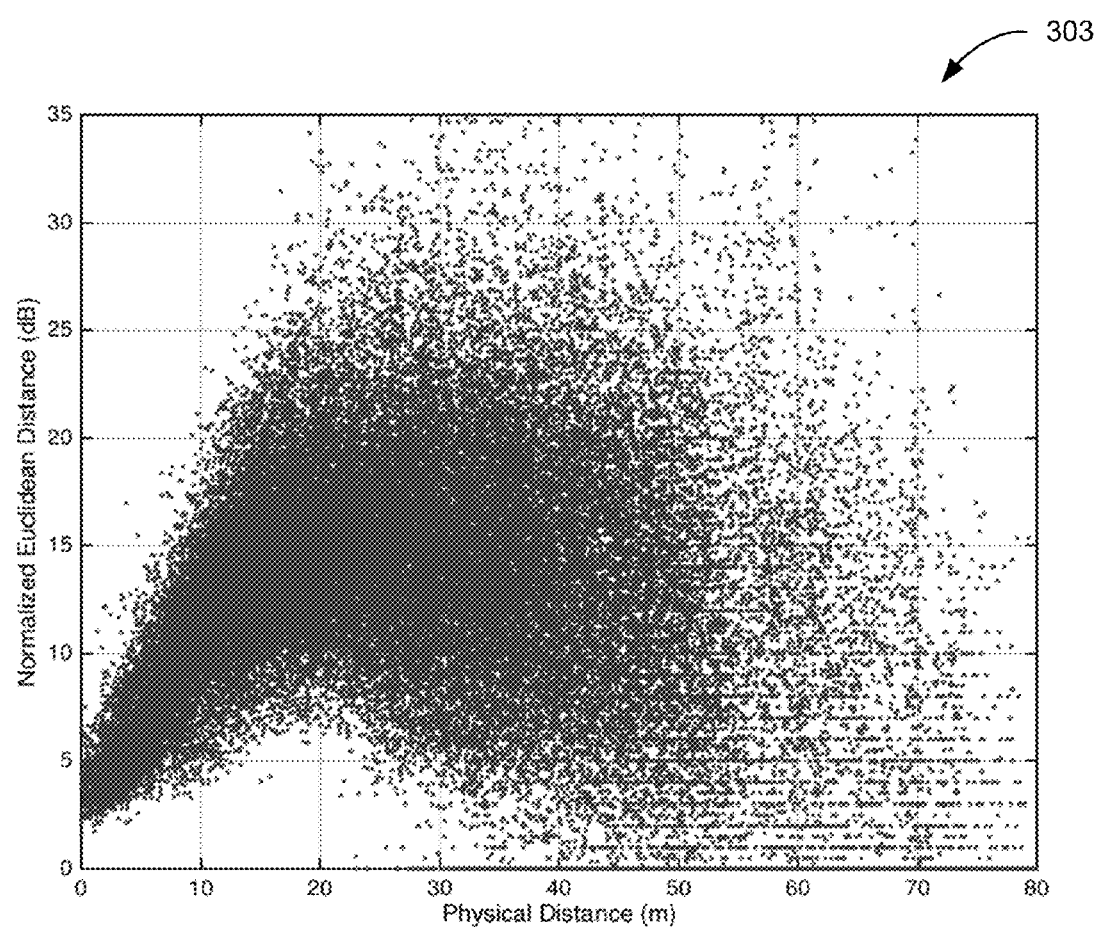
FIG. 3C is a chart of a plurality of sample points where each point represents a normalized Euclidean distance in units of dB measured at various physical distances, according to embodiments of the present invention.

In yet other embodiments, the size of the kernel function in sensor space may depend on the correlation between measured values and physical distances. Having a correlation between measured values and physical distances may allow the mobile device to accurately determine the location of multi-dimensional data points for determining relative distances. FIG. 3C is a chart 303 illustrating a plurality of sample points where each point represents a normalized Euclidean distance in units of dB measured at various physical distances. The sample points may all have common device IDs, meaning the sample points are all measured from the same signal sources. The X-axis represents physical distance in meters that increases to the right, and the Y-axis represents normalized Euclidean distance in dB that increases upward. As illustrated in FIG. 3C, a linear correlation may be observed between a physical distance of 0 to 15 m. Thus, it would be suitable to select a kernel function size that is not greater than 15 m. This ensures that the RF distance function is monotonic throughout and linear in near-distance range. The choice of kernel function parameters (sigma and power for Gaussian distributions) can tune the large-scale size and smoothness of the physical location. The relationship between physical distance and sensor distance (e.g., as shown in FIG. 3C) can be used to determine a distance function.

Figure 3D:
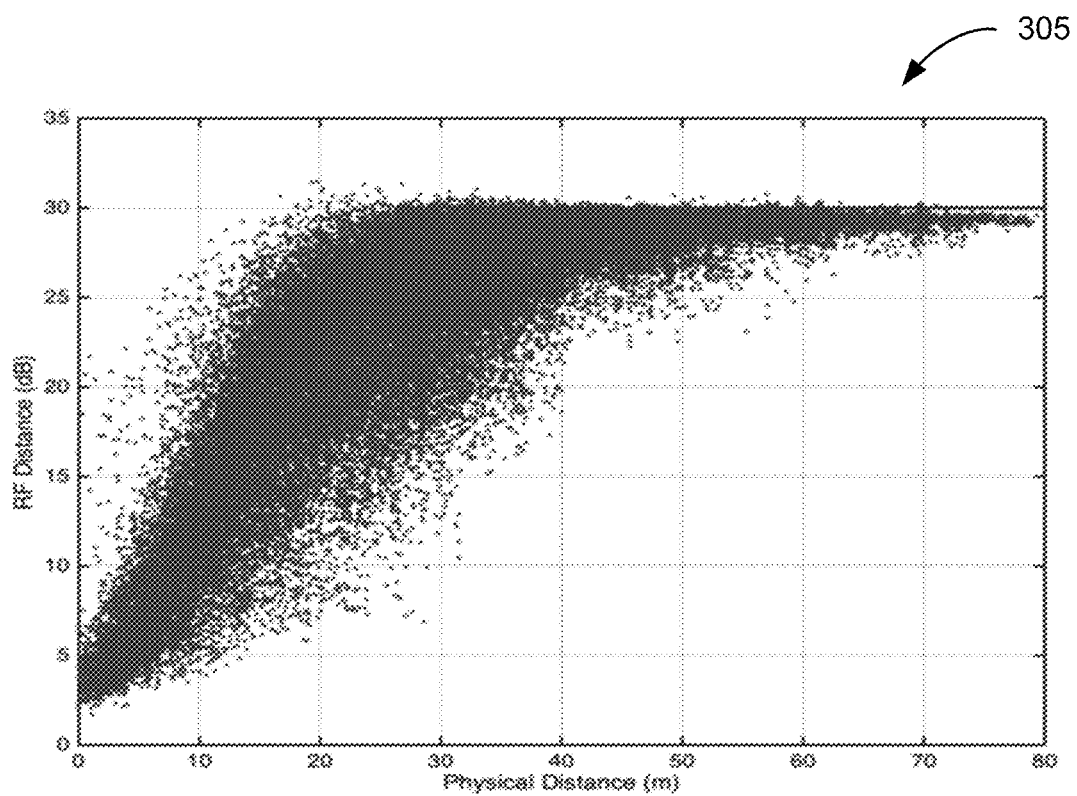
FIG. 3D is a chart of a plurality of sample points where each point represents a measured RF signal from a signal source at various physical distances from that signal source, according to embodiments of the present invention.

If, however, having larger-sized kernel functions are desired, then larger kernel functions may be enabled if different types of sensor values are measured. For instance, multi-dimensional data points based on measured radio frequency (RF) values may enable the mobile device to use larger kernel functions. FIG. 3D is a chart 305 illustrating a plurality of sample points where each point represents a measured RF signal from a signal source at a physical distance from that signal source in physical space. The X-axis represents physical distance in meters that increases to the right, and the Y-axis represents RF distance in dB that increases upward. As shown in FIG. 3D, a linear correlation may be observed between a physical distance of 0 to 25 m. Thus, it would be suitable to select a kernel function size that is not greater than 25 m when the multi-dimensional data points include sensor values in the form of RF measurements.

Figure 3E:
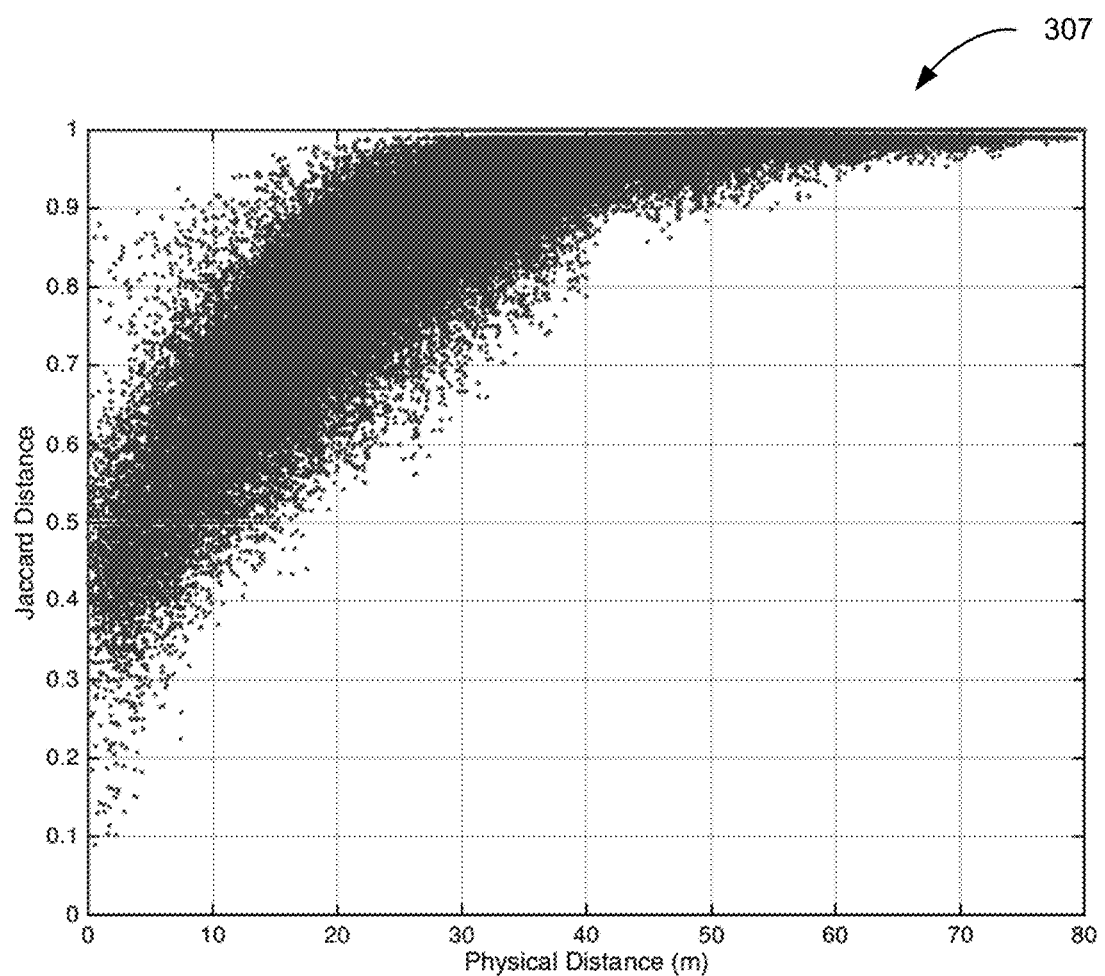
FIG. 3E is a chart of a plurality of sample points where each point represents a normalized Jaccard distance measured at various physical distances from that signal source, according to embodiments of the present invention.

In some embodiments, even larger kernel functions may be enabled by measuring sensor values based upon a combination of signal strength and device ID, where the measured sensor values may be from different signal sources. In such embodiments, measured sensor values may not only include measured signal parameters (e.g., RSSi or TOF), but also the device ID associated with respective measured signal parameters. Including device ID as a part of the sensor values for a multi-dimensional data point allows the mobile device to distinguish between multi-dimensional data points based upon the devices from which signals are measured. For instance, if two data points do not have measurements from the same devices, then the mobile device may determine that the two physical locations from which the data points were measured are far apart. FIG. 3E is a chart 307 illustrating a plurality of sample points where each point represents a normalized Jaccard distance measured at various physical distances from that signal source. A Jaccard distance is a signal value that is a combination of a measured signal parameter and the device ID of the signal source emitting the signal from which the measured signal parameter is determined. The X-axis represents physical distance in meters that increases to the right, and the Y-axis represents normalized Jaccard distance that increases upward. As shown in FIG. 3E, a linear correlation may be observed between a physical distance of 0 to 40 m. Thus, the kernel function size can be selected to be a distance no greater than 40 m when the multi-dimensional data points include sensor values in the form of normalized Jaccard distances.

C. Distance Function

In embodiments, measured sensor values exist as multi-dimensional data points in sensor space, meaning that the exact coordinates of the corresponding physical position is not known. The multi-dimensional data points may just be measurements of sensor values without regard to physical location. Thus, for the mobile device to determine its probability of being within a kernel function in physical space, a distance function may be used to convert between physical space and sensor space, in instances where the kernel function is defined only in physical space.

Figure 4:
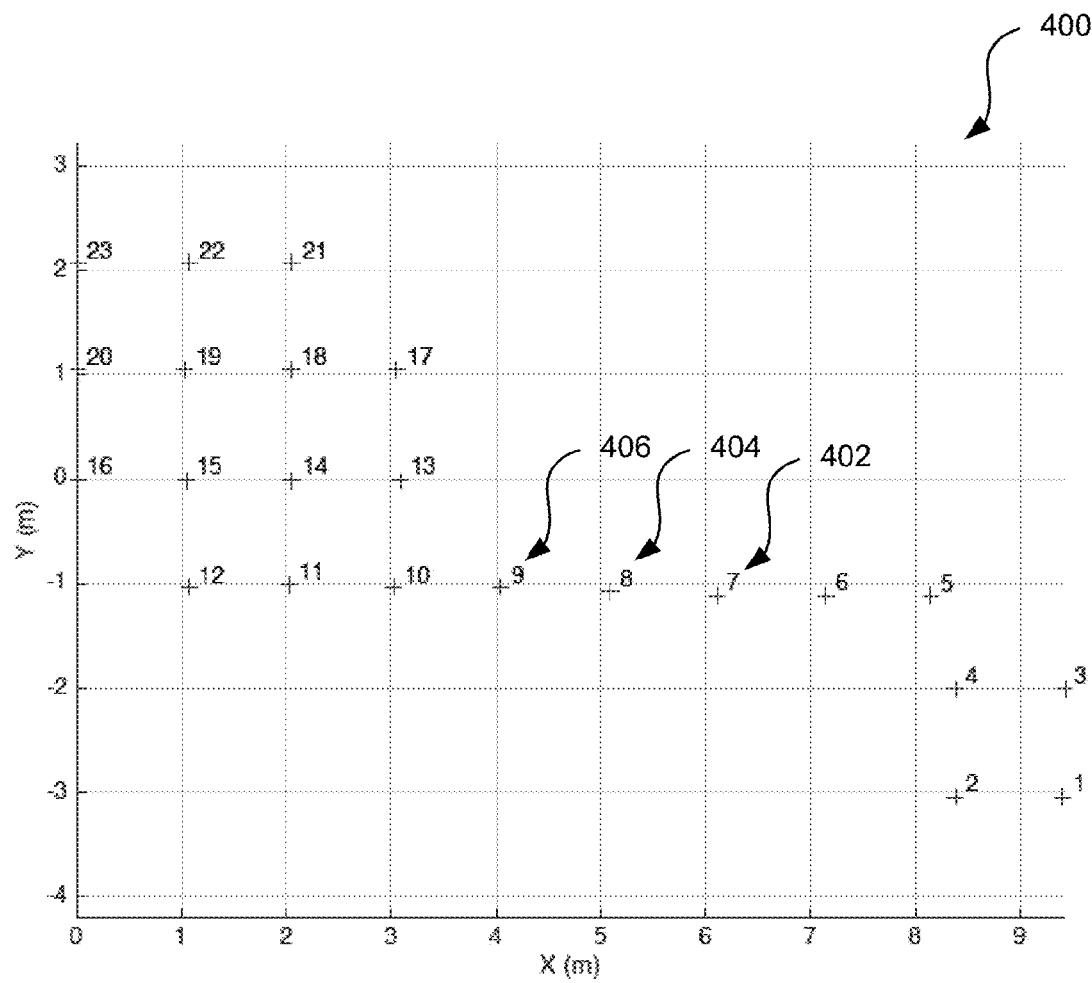
FIG. 4 illustrates an exemplary grid for determining a distance function, according to embodiments of the present disclosure.

A distance function is a conversion function between physical distance and sensor distance. One way to determine the distance function is to sample signal values at known physical locations at known distances apart, and then determine the rate at which the signal values change from one of those locations to another. For instance, FIG. 4 illustrates an exemplary grid 400 representing an area of physical space. The X and Y axis of grid 400 may represent a distance in one meter increments. The mobile device may measure the sensor values near the intersection of the grid lines in any particular order.

As shown in FIG. 4, an exemplary measurement order is shown by the plus "+" signs representing measurement locations. At each measurement location the sensor value is measured and then used to determine a degree of change from one location to the next. Given that the distance between each measurement location is known, the change in sensor value per change in distance can be determined. For instance, the sensor value at measurement locations 402, 404, and 406 may be 10 dB, 11 dB, and 12 dB, respectively.

Given that the distance between each measurement location is 1 m, then the change in sensor value per 1 m may be 1 dB.

The change in sensor value per change in distance can then be used as a distance function to convert between a kernel function in physical space and a kernel function in sensor space, e.g., a distance function defined as 1 dB per 1 m. In some embodiments, the change in sensor value per distance is not linear, e.g., a change from 21 dB to 20 dB may be a shorter distance than a change from 6 dB to 5 dB. But, such a difference can be accounted for in the distance function. Although this example discusses that a change in sensor value per 1 m may be 1 dB, it is to be appreciated that this change in dB per meter is not intended to be limiting. Rather, other rates that are greater or less than 1 dB per 1 m change are envisioned herein. For example, a change of 3 dB per 1 m may be envisioned in some embodiments.

This distance function may be used as a default distance function across one or more mobile devices. In embodiments, the default distance function may scale to match a gain of an antenna for the respective device. For instance, if one mobile device has an antenna with a lower gain than another mobile device, then the default distance function for the mobile device with a lower antenna gain may have a proportionately lower default distance function.

In some embodiments, the default distance function may change to be more accurate during use of the mobile device. For example, during normal use, the mobile device may periodically calibrate the distance function by measuring sensor values at predetermined distances of movement detected by PDR. The change in sensor values with respect to change in distance may then be used to adjust/fine tune the default distance function for a more accurate conversion between physical space and sensor space.

D. Kernel Function in Sensor Space

With the distance function established, the kernel function in physical space can be converted to a kernel function in sensor space. For instance, knowing that the kernel function in physical space has a width of 5 m and is defined by (i.e., centered around) a representative multi-dimensional data point, then it can be determined that the corresponding kernel function in sensor space has a width of 25 dB. This information can then be used to determine a probability of being within the cluster defined by the representative multi-dimensional data point.

Figure 5:
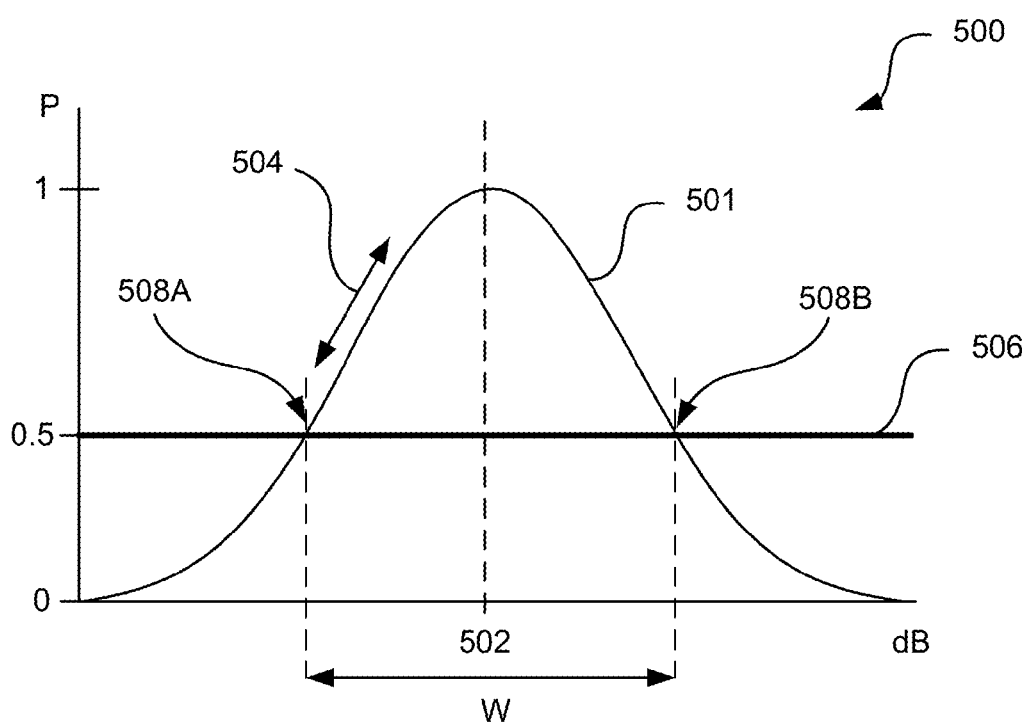
FIG. 5 is a graph plotted with an exemplary kernel function in sensor space, according to embodiments of the present disclosure.

FIG. 5 is a chart 500 plotting an exemplary kernel function 501 in sensor space. Similar to kernel function 301 in physical space, kernel function 501 in sensor space may have a width W and a decay 504. However, instead of the X-axis being defined in units of distance, the X-axis may be defined in units of decibels (dB). Thus, width W may be a certain range of decibels instead of meters. A probability threshold 506 may define the boundaries of kernel function 501 in sensor space, similar to the discussion of kernel function 301 in physical space. New sensor positions determined to have a distance be between intersection points 508A and 508B have a high probability of being within the physical location represented by kernel function 501. If the distance function is not linear, kernel function 501 may be non-symmetric, depending on where the signal source is located relative to point 502. If the kernel function is non-symmetric, then a direction for the sensor distance can be determined and used as a vector to identify the corresponding value in the kernel function.

In some embodiments, a kernel function in sensor space may be defined by a manufacturer directly instead of having to convert a kernel function in physical space to a kernel function in sensor space. In such embodiments, the kernel function in sensor space may already be known due to prior calibration or from previous research.

According to embodiments, kernel functions in sensor space, distance functions, and kernel functions in physical space may be used to determine a probability of a mobile device being located within a physical location. As discussed herein, a physical location may be defined by a kernel function bound by a probability threshold that is centered around a representative position corresponding to a multi-dimensional data point that is representative of a cluster of multi-dimensional data points. Thus, the physical location may correspond to the area of a cluster of multi-dimensional data points in sensor space defined by a probability threshold.

III. Example Determination of Probability

Figure 6A:
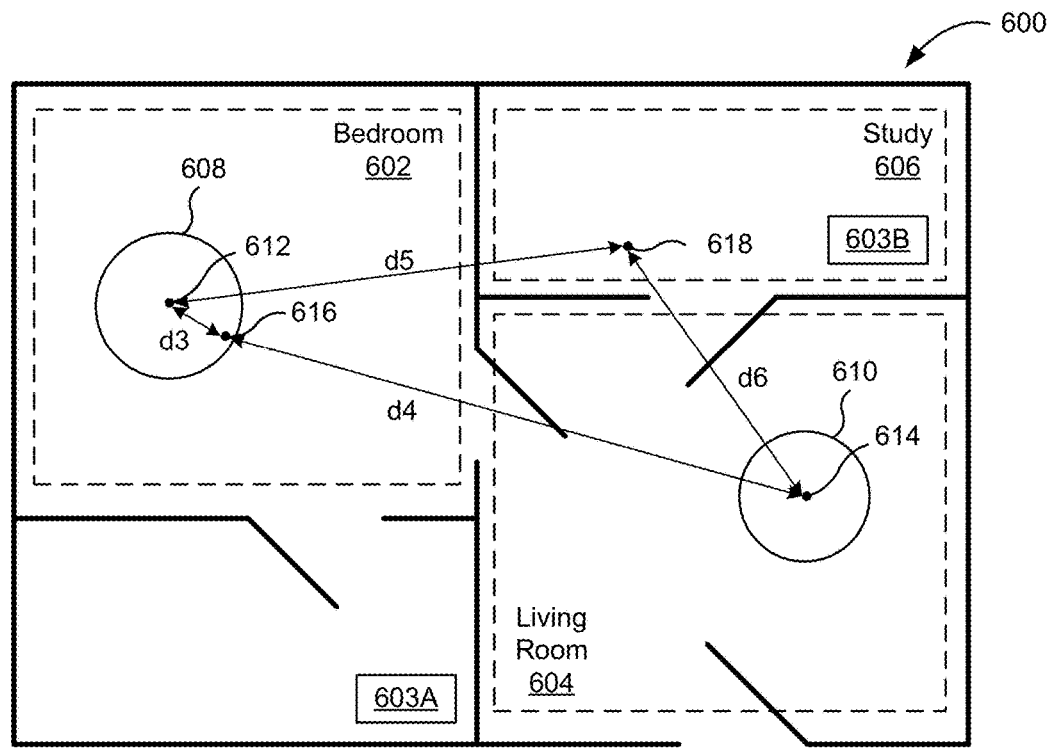
FIG. 6A is a simplified diagram illustrating an exemplary floor plan in physical space for determining a probability of being in a physical location, according to embodiments of the present disclosure.
Figure 6B:
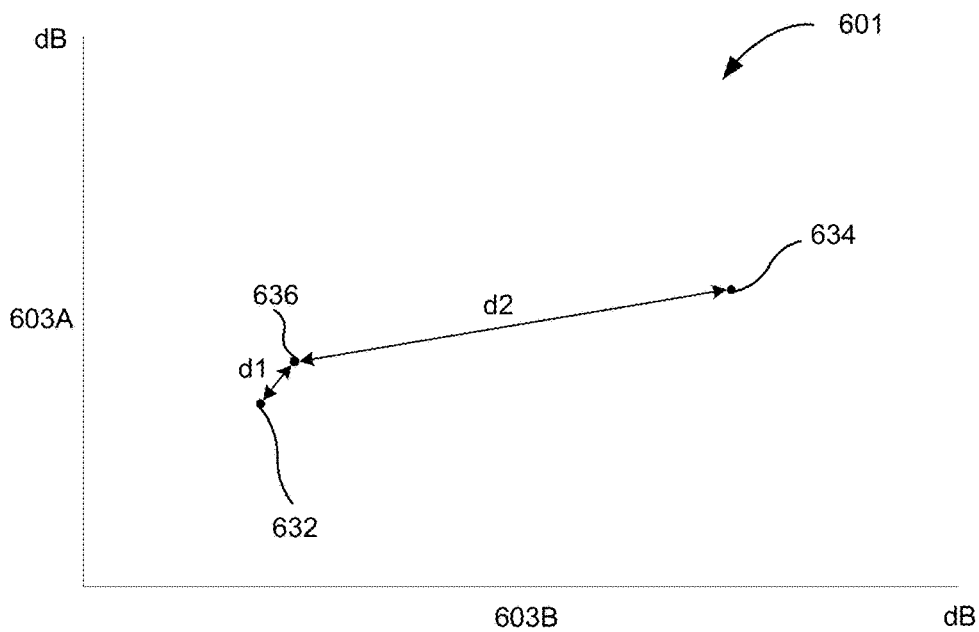
FIG. 6B is a simplified diagram illustrating the exemplary floor plan of FIG. 6A in sensor space for determining a probability of being in a physical location, according to embodiments of the present disclosure.

FIGS. 6A and 6B illustrate exemplary determination of probabilities of being in a physical location in physical space and sensor space, according to embodiments of the present disclosure. Specifically, FIG. 6A illustrates the determination of probabilities in physical space, and FIG. 6B illustrates the determination of probabilities in sensor space. The physical space (e.g., floor plan 600) illustrated in FIG. 6A may correspond with the sensor space 601 illustrated in FIG. 6B. Because there are two signal sources 603A and 603B, sensor space 601 may be represented by an X and Y axis, where each axis represents a signal strength of an emitted signal from signal sources 603B and 603A, respectively.

As shown in FIG. 6A, floor plan 600 may include a bedroom 602, living room 604 and a study 606. Two physical locations 608 and 610 may be defined by kernel functions in physical space centered around corresponding representative physical positions 612 and 614. An example kernel function is shown in FIG. 7A.

Figure 7A:
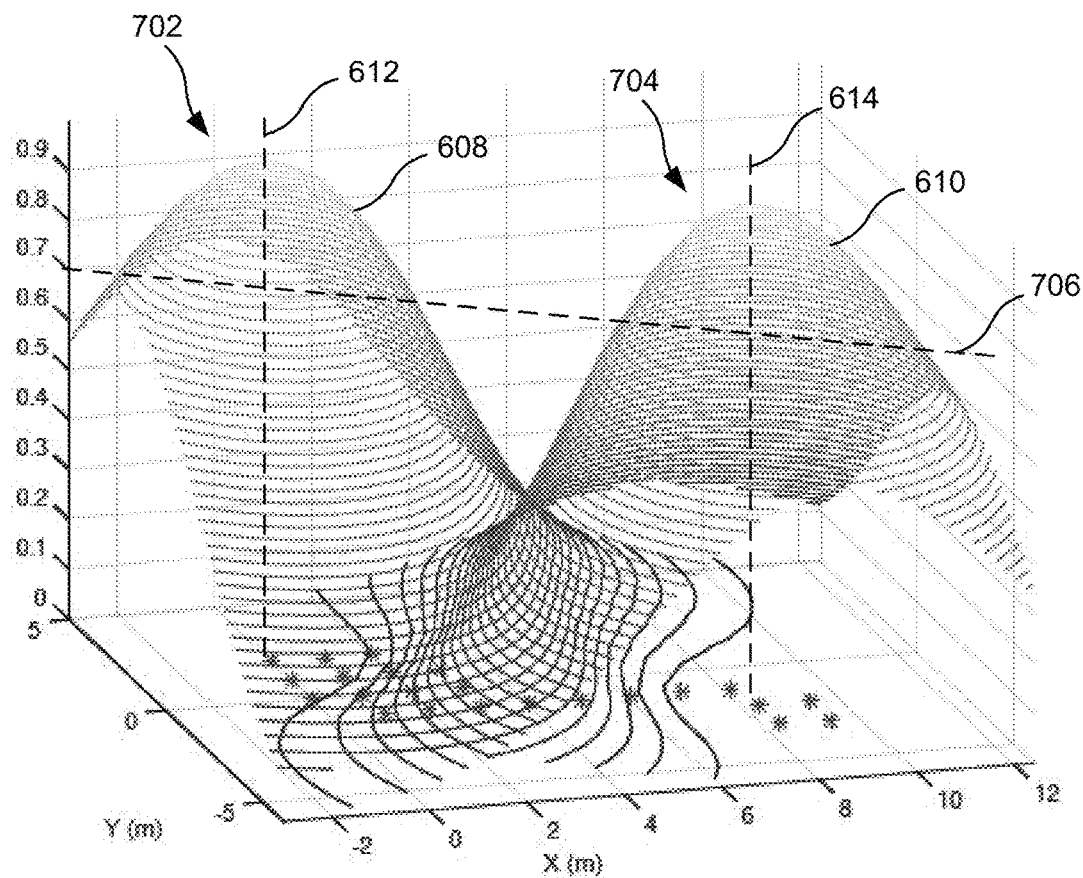
FIG. 7A is a chart illustrating kernel functions associated with two physical locations, according to embodiments of the present disclosure.

FIG. 7A is a chart illustrating a three-dimensional representation of kernel functions 702 and 704 for physical locations 608 and 610, respectively, that are centered around representative physical positions 612 and 614 for floor plan 600 shown herein as a grid. Probability threshold 706 may be set at 0.7 to establish the boundaries of each physical location 608 and 610. Representative physical positions 612 and 614 may correspond to multi-dimensional data points that are near the center of respective clusters of multi-dimensional data points gathered during prior use of a mobile device. In embodiments, representative physical positions 612 and 614 in physical space may be known by a mobile device as corresponding to representative multi-dimensional data points 632 and 634 in sensor space, respectively, as shown in FIG. 6B.

In embodiments, the mobile device may measure sensor values and form a new multi-dimensional data point while inside floor plan 600. Once the new multi-dimensional data point is formed, the mobile device may determine the probability of the mobile device being in one of the two physical locations 608 or 610. One way of determining the probability of the mobile device being in one of the physical locations is by converting a distance in sensor space to a distance in physical space and then determining the probability of the physical position being in a kernel function represented by a physical location in physical space.

For instance, FIG. 6B illustrates a new multi-dimensional data point 636 formed by a mobile device at the corresponding physical position 616 in floor plan 600 in FIG. 6A. To determine a probability of being in one of physical locations 608 or 610, a sensor distance may first be calculated between the new multi-dimensional data point 636 and each representative multi-dimensional data point 632 and 634 in sensor space. The sensor distance may be any suitable representation of spatial distance between two points, such as a Euclidean distance.

As shown in FIG. 6B, the sensor distance between representative multi-dimensional data point 632 and new multi-dimensional data point 636 may be sensor distance d1, and the distance between representative multi-dimensional data point 634 and new multi-dimensional data point 636 may be d2. Because the distance is calculated in sensor space, distances d1 and d2 may be represented in units of dB. Once sensor distances d1 and d2 are calculated, they may be converted to units in physical space using a distance function (discussed herein with respect to FIGS. 3C-3E and 4). For example, sensor distance d1 may be converted to physical distance d3, and sensor distance d2 may be converted to physical distance d4 as shown in FIG. 6A. The physical distances d3 and d4 may then be used to determine a probability of being in physical locations 608 and 610 in physical space by referencing the kernel function and probability threshold of physical locations 608 and 610.

The probability of being in any one of the clusters may be defined by an equation as:

$$\hat{p}(i) = P(X = i | X = 0 \lor X = i)$$

Where $\hat{p}$ represents a probability of being in any of the clusters, and i is one of the clusters. Then, using Bayes' rule and assuming that being associated with a physical location is a disjoint event, the equation becomes:

$$\hat{p}(i) = P(X = i | X = 0 \lor X = i)$$
$$= \frac{P(X = i)P(X = 0 \lor X = i | X = i)}{P(X = 0 \lor X = i)}$$
$$= \frac{P(X = i)}{P(X = 0) + P(X = i)}$$
$$= \frac{p(i)}{p(0) + p(i)}$$

Rearranging Yields:

$$p(i) = p(0)\left(\frac{\hat{p}(i)}{1 - \hat{p}(i)}\right)$$

In some embodiments, the probability of being in any one of the clusters may be determined by a localization algorithm. The localization algorithm may be used to populate a probability vector p(i) given a vector of distances d'(j) from a new multi-dimensional data point to a representative multi-dimensional data point, where $0 \le i \le M$ and $0 < j \le N$. Similar to the equation above, the physical location-specific probability $\hat{p}(i)$ may be first computed using a kernel function, and then transferred into p(i). However, the kernel functions may require computing some sort of aggregate distance d(i) to each physical location i. Let S(i) be the set of all representative multi-dimensional data points associated with the physical location i. Then, example aggregate distance functions may include:

$$d_{min}(i) = \min_{j \in S(i)} d'(j)$$

$$d_{avg}(i) = \frac{1}{|S(i)|} \sum_{j \in S(i)} d'(j)$$

which may be similar to the 1-norm, $$d_{sqr}(i) = \sqrt{\frac{1}{|S(i)|} \sum_{j \in S(i)} d'(j)^2}$$

which may be similar to the 2-norm, e.g., square root of the 1-norm squared, or $$d_{max}(i) = \max_{j \in S(i)} d'(j)$$

which may be similar to the infinity-norm. The parameters of the kernel function can be optimized so that a difference between the output and the prior or empirical probability map is minimized in a least-squares sense.

Thus, using the equations discussed herein, the probabilities of being in each physical location may be determined. In embodiments, physical position 616 having a distance d3 away from representative physical position 612 may have a greater probability of being in physical location 608 than the probability of being in physical location 610. Specifically, the probability of physical position 616 being in physical location 608 may be greater than a probability threshold as it is disposed within the boundaries of physical location 608. The probability of physical position 616 being in physical location 610 may be substantially small. If, however, the probability of a new physical position being in any one of the physical locations is less than the probability threshold for all physical locations, then it may be determined that the new physical position is in a null cluster, meaning not in any physical location.

Figure 7B:
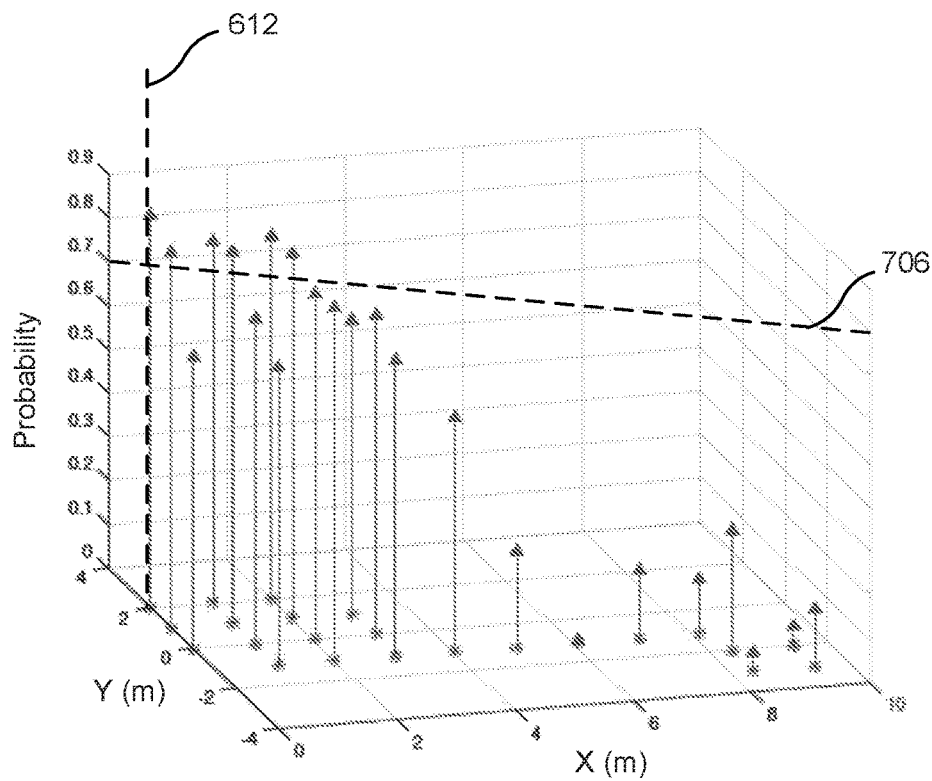
FIGS. 7B and 7C are charts illustrating exemplary calculated probabilities for a plurality of physical positions with respect to two physical locations, according to embodiments of the present disclosure.
Figure 7C:
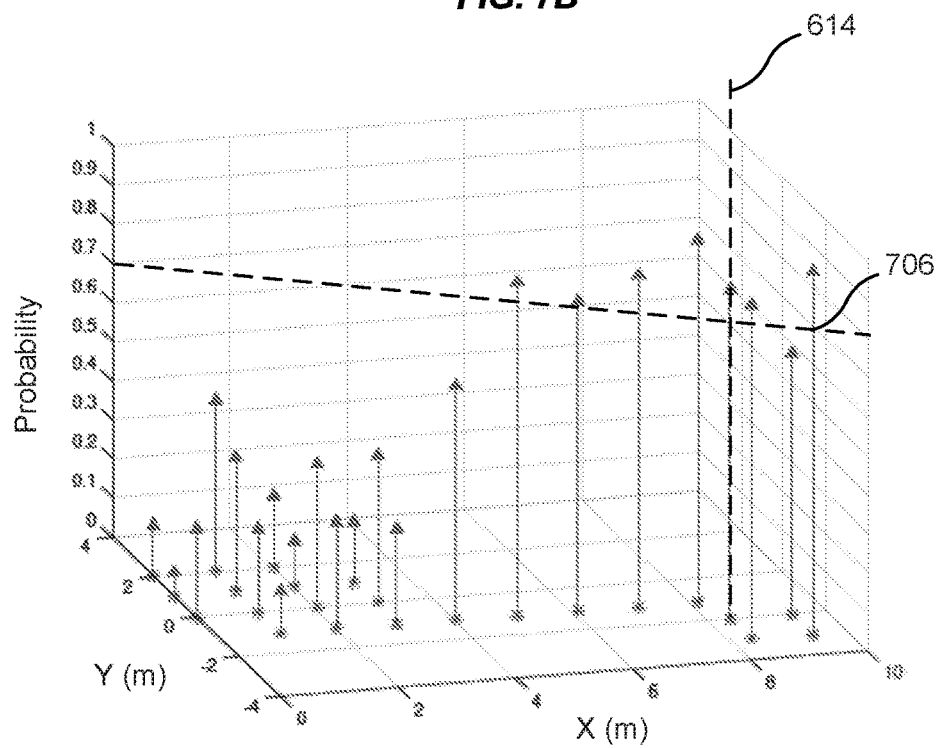

FIGS. 7B and 7C illustrate exemplary probabilities calculated at various positions within floor plan 600. Specifically, FIG. 7B illustrates the probabilities of being in physical location 608, and FIG. 7C illustrates the probabilities of being in physical location 610. Each probability is calculated for a specific physical position, such as the physical positions discussed herein with respect to FIG. 4. As shown in FIG. 7B, probabilities close to representative physical position 612 may be higher than those probabilities farther away from representative physical position 612. Positions having probabilities above probability threshold 706 may be determined to be within physical location 608. Likewise, as shown in FIG. 7C, probabilities close to representative physical position 614 may be higher than those probabilities farther away from representative physical position 614. Thus, positions having probabilities above probability threshold 706 may be determined be within physical location 610.

Figure 7D:
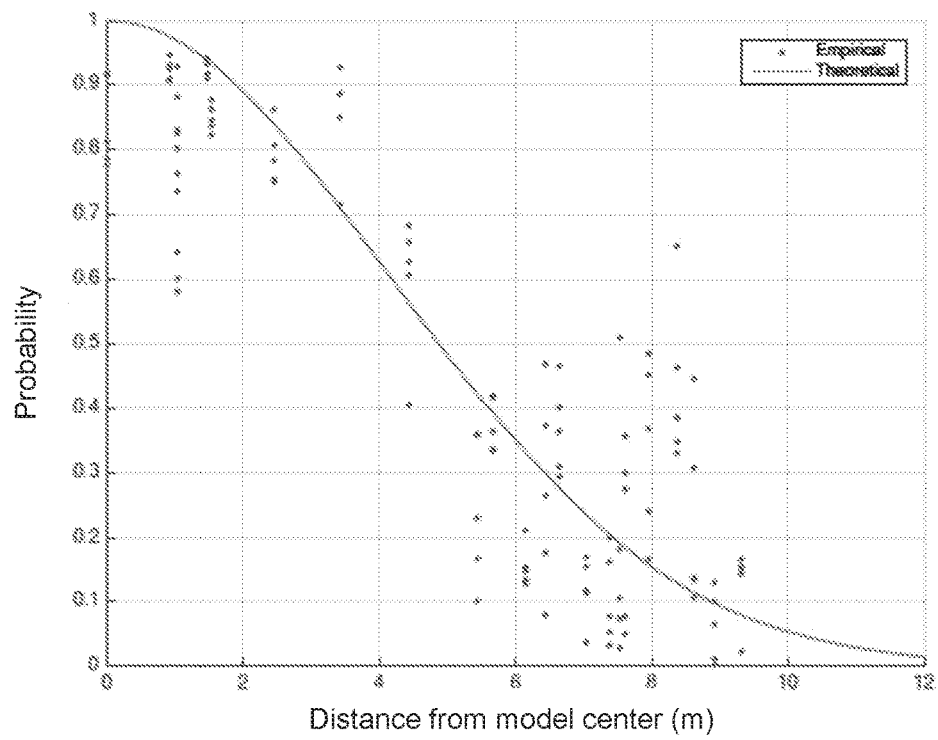
FIGS. 7D and 7E are charts illustrating calculated probabilities with respect to associated kernel functions with respect to two physical locations, according to embodiments of the present disclosure.
Figure 7E:
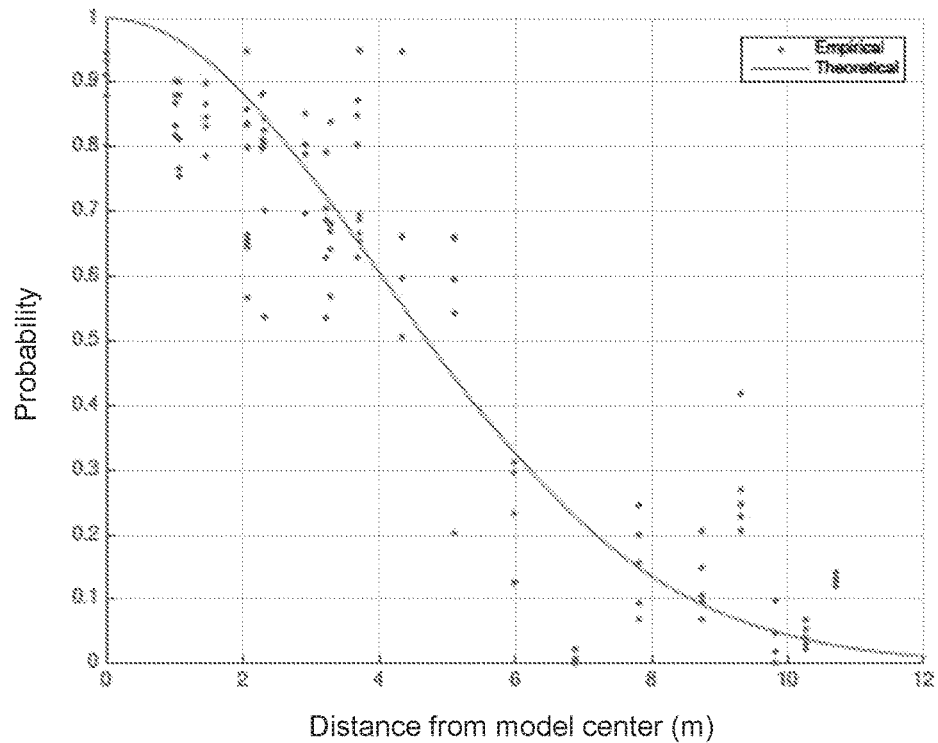

FIGS. 7D and 7E are charts illustrating exemplary probabilities calculated over time as compared to a kernel function. FIG. 7D may be a chart illustrating probabilities calculated over time for a kernel function associated with representative physical position 612, and FIG. 7D may be a chart illustrating probabilities calculated over time for a kernel function associated with representative physical position 614. As shown in FIGS. 7D and 7E, probabilities calculated for each position may generally follow the kernel function distribution where probabilities for locations closer to the representative physical positions have higher probabilities of being within the physical location than other locations farther away from the representative physical positions.

Figure 7F:
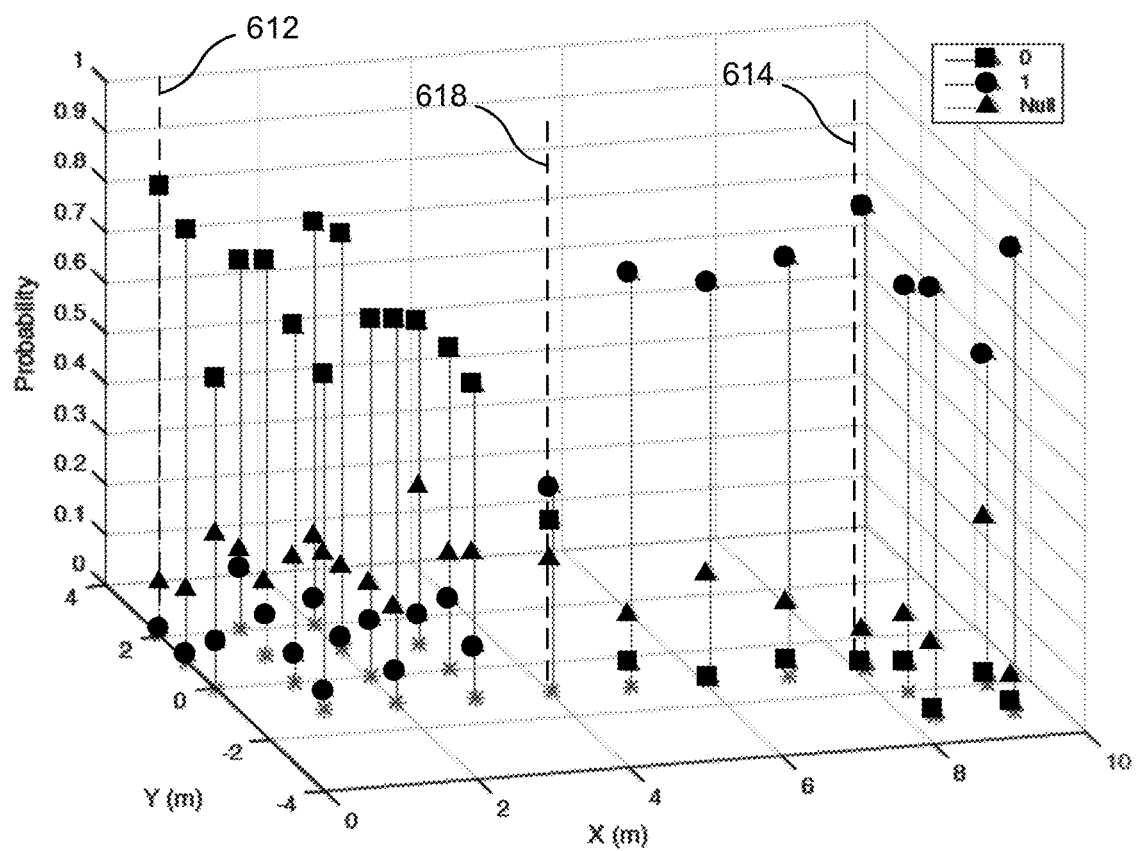
FIG. 7F is a chart illustrating superimposed probabilities calculated for two physical locations and for a null cluster, according to embodiments of the present disclosure.

FIG. 7F illustrates probabilities calculated for both representative physical positions superimposed in a single chart. As shown, physical positions closer to representative physical position 612 may have higher probabilities of being in physical location 608, and physical positions closer to representative physical position 614 may have higher probabilities of being in physical location 610. In embodiments, locations that are far away from both representative physical positions 612 and 614 may have low probabilities of being in either physical location 608 or 610. These locations may instead have a higher probability of being in a null cluster. The null cluster may correspond with a region of physical space that is not associated with any physical location. As shown in FIG. 7F, physical position 618 may be at a position where the probability of being in any one of physical locations 608 and 610 is relatively small, while the probability of being in a null cluster is relatively large. It is to be appreciated that those locations having a high probability of being in one of the physical locations may have a low probability of being in the null cluster.

IV. Null Cluster

According to embodiments, a null cluster represents regions in physical space and sensor space that are not designated as physical locations, i.e., areas designated as clusters of multi-dimensional data points. The probability of a physical position being in the null cluster can be determined when the probability of the physical position being in any one of the physical locations is lower than a probability threshold. In some embodiments, the probability of the null cluster p (0) can be determined by enforcing the probability vector constraint $$\sum_{i=0}^{M} p(i) = 1,$$

where M is the number of physical locations (e.g., determined by clusters of multi-dimensional data points). Rearranging yields:

$$p(0) = \left(1 + \sum_{i=1}^{M} \frac{\hat{p}(i)}{1 - \hat{p}(i)}\right)^{-1}.$$

A corner case may occur when one or more of the $\hat{p}(i)=1$. In such instances, let S be the set of all physical locations with probability one. Then, the probability vector may be defined by:

$$p(i) = \begin{cases} \frac{1}{|S|} & i \in S \\ 0 & \text{otherwise} \end{cases}$$

where |•| is the cardinality operator.

Thus, using the equations discussed herein, the probability of a physical location being in a null cluster may be determined. For instance, as shown in FIG. 6A, a physical position 618 may be located within study 606 and be located a distance d5 and distance d6 away from representative physical positions 612 and 614. It is to be appreciated that distances d5 and d6 may be determined by converting its corresponding sensor distance into physical distance as discussed herein. Using distances d5 and d6, it may be determined that the probability of being in physical location 608 and physical location 610 may be lower than a probability threshold, thereby indicating that it is not within either of physical locations 608 or 610. However, the probability p(0) may be greater than a probability threshold, thereby indicating that the device is in the null cluster. Accordingly, the device may determine that it is in the null cluster.

V. Method of Determining the Location of a Mobile Device

Figure 8:
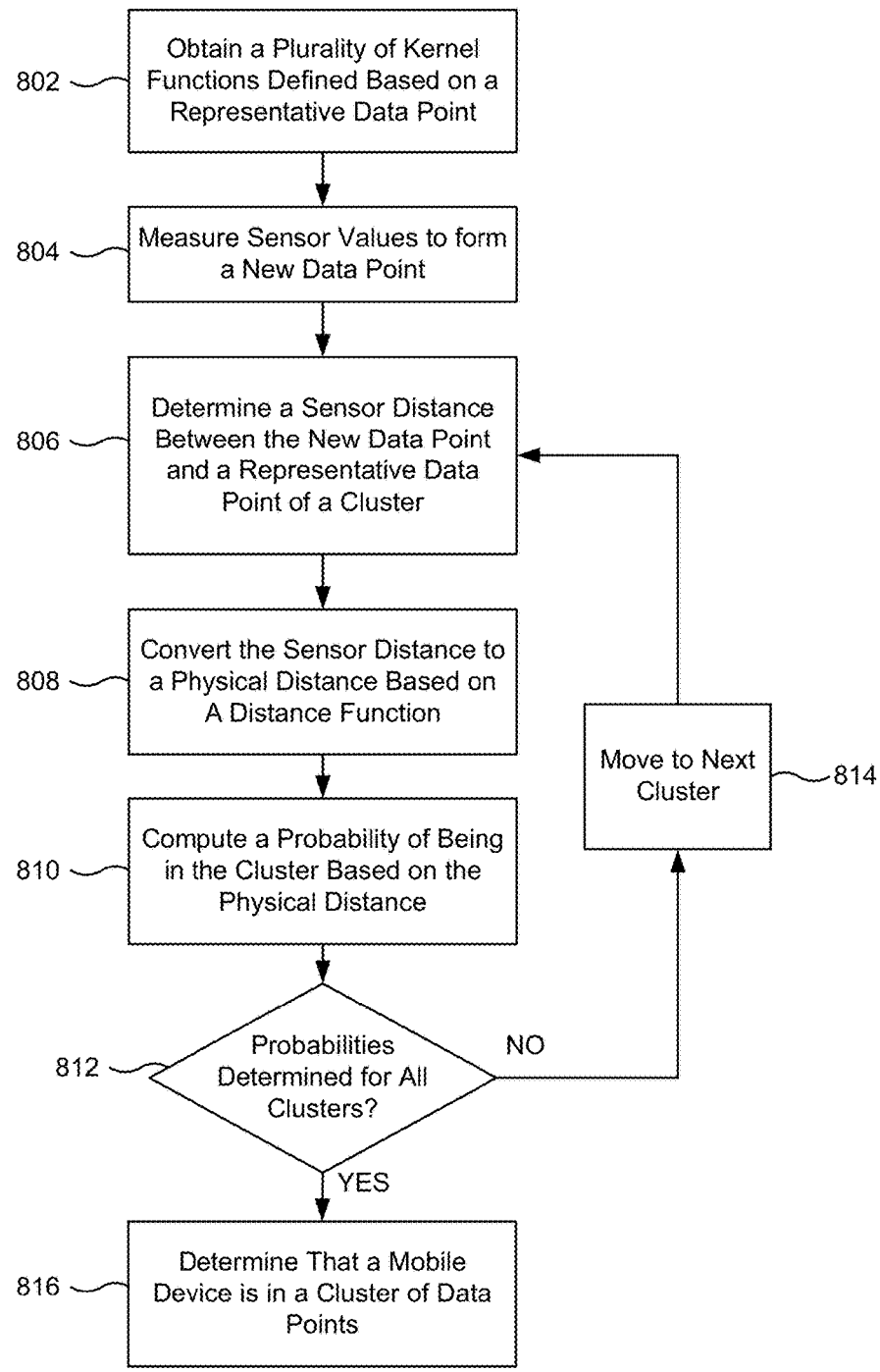
FIG. 8 is a flow chart for a method of determining a location of a mobile device with respect to physical locations, according to embodiments of the present disclosure.

FIG. 8 is a flow chart illustrating a method of determining the location of a mobile device with respect to a physical location, according to embodiments of the present disclosure. The method can be performed by the mobile device. Before the method is executed, the mobile device may perform measurements at various physical positions, with each measurement forming a sensor position. These sensor positions can be clustered. Further, a kernel function can be defined for each cluster, e.g., as described above.

At block 802, a plurality of kernel functions are obtained. For instance, a plurality of kernel functions in physical or sensor space may be obtained from a database. Each kernel function may be defined based on (e.g., centered around) a representative physical position, as discussed herein with respect to FIGS. 3A and 3B. The representative physical position may correspond to a representative data point that is near or at a center or other centroid of a cluster of data points. In embodiments, the representative data point may be an average/mean of all of the data points in the cluster. The representative data point may be a multi-dimensional data point as discussed herein with respect to FIG. 1B, or may be a single-dimensional data point if the representative data point includes only one sensor value.

At block 804, one or more sensor values are measured by one or more sensors in a mobile device to form a new data point in sensor space. The one or more sensor values may be properties of wireless signals emitted from one or more signal sources. The new data point may correspond to a current physical position of the mobile device. The new data point may be a multi-dimensional data point as discussed herein with respect to FIG. 1B, or may be a single-dimensional data point if the new data point includes only one sensor value.

At block 806, a sensor distance between the new data point and the representative data point of one of the clusters is determined. The sensor distance may be a Euclidean distance between the new data point and the representative data point. Accordingly, the sensor distance may be the distance between the two data points in sensor space. In order to determine the probability of the new data point being in the cluster defined by the representative data point, the sensor distance may need to be converted into a physical distance using distance function, e.g., if a kernel function in physical space is used. If a kernel function in sensor space is used, the distance function may have previously been used to create the kernel function in sensor space.

At block 808, the sensor distance may be converted to a physical distance. In embodiments, a distance function may be used to convert the sensor distance to the physical distance. An exemplary distance function is discussed herein with respect to FIGS. 3C-3E and 4.

At block 810, the probability of being in the cluster based on the physical distance is computed. The probability may be determined based on the equation discussed herein with respect to FIGS. 6A and 6B. In embodiments, the probability is dependent on a distance function of the sensor distance to a physical distance between physical positions, where the distance function is determined from measurements of changes in sensor values among various physical positions, as discussed herein with respect to FIG. 4.

At block 812, it may be determined whether probabilities have been determined for all known clusters of multi-dimensional data points. If not, then at block 814, another representative data point for another cluster may be selected. Then, the probability of the new data point being in the newly selected cluster may be determined starting back at block 806.

If, however, the probabilities for all clusters have been determined, then at block 816, a cluster within which the new data point is located may be determined. The cluster may correspond to the physical location within which the physical position is located. This determination may be performed by comparing the probability of being in each physical location with a probability threshold. The probability threshold may define a boundary of each physical location. If the probability is greater than a probability threshold for a certain physical location, then it may be determined that the mobile device is located within that physical location. In instances where the probability for more than one cluster is above the threshold, the highest probability can be selected. Other criteria can also be required, e.g., the highest probability can be required to be at least a certain amount greater than the second highest probability.

In some embodiments, the mobile device may perform an action based on the determined physical location. The mobile device may, for example, identify an application associated with the physical location and present the identified application to the user, such as in the form of an icon on a display screen of the mobile device. The identified application may be an application that the user typically uses within the physical location. The user can select the icon to run the identified application without having to actively search for the application that is intended to be used. In another example, the mobile device may send, using the identified application, a message to the user reminding the user to perform a task when the user is positioned in the physical location. In yet another example, the identified application can send control signal to another device. Having the mobile device able to determine its physical location in this manner allows the mobile device to enhance user friendliness and usefulness.

Figure 9:
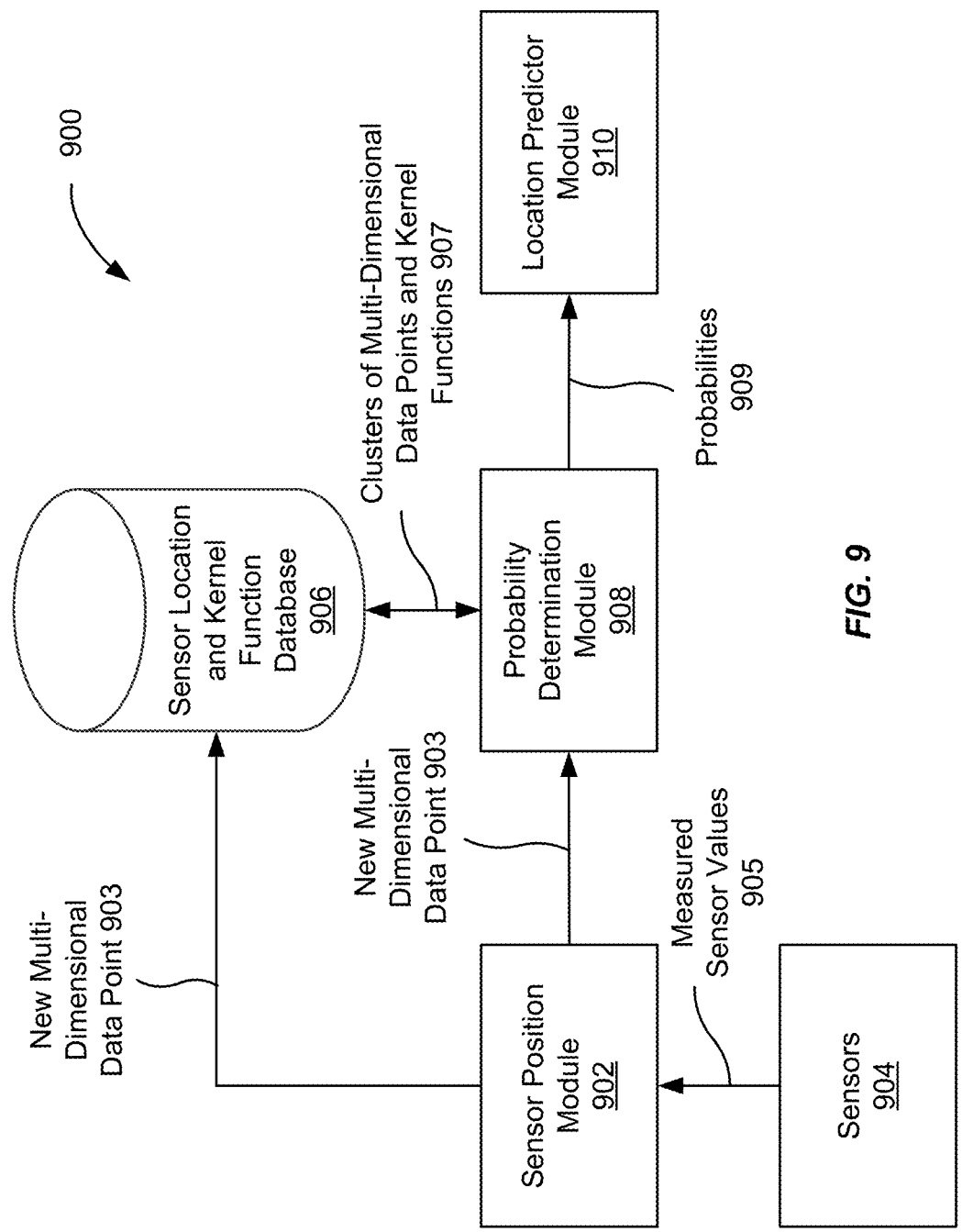
FIG. 9 is a simplified diagram illustrating an exemplary system for determining a location of a mobile device with respect to physical locations, according to embodiments of the present disclosure.

VI. System for Determining the Location of a Mobile Device with Respect to a Cluster FIG. 9 is a simplified diagram illustrating an exemplary system 900 for determining the location of a mobile device with respect to a physical location. According to embodiments of the present disclosure, system 900 may be configured to measure sensor values at a physical position of a mobile device, form a multi-dimensional data point corresponding to the physical position with the measured sensor values, determine a probability of the mobile device being in known physical locations, and then determine whether the mobile device is in one of the known physical locations or not in any known physical location.

A. Sensor Location Module

System 900 may include a sensor position module 902 coupled to sensors 904 to receive one or more measured sensor values from one or more signal sources. Sensors 904 may be one or more hardware component that is configured to receive transmission signals, such as Wi-Fi signals, Bluetooth signals, radio frequency (RF) signals, and any other type of signal capable of transmitting information wirelessly. The received transmission signals may be measured to generate one or more sensor values 905. Sensor values 905 may be sent to a sensor location module 902.

Sensor location module 902 may be software code configured to receive information from one or more sensors and write data to a database. In embodiments, sensor location module 902 may receive sensor values measured from sensors 904, form a corresponding multi-dimensional data point with the measured sensor values, and write the multi-dimensional data point to a sensor location and kernel function database 906. Database 906 may be any conventional database suitable for storing information. In certain embodiments, database 906 stores a plurality of kernel functions and multi-dimensional data points. Each kernel function can have the same parameters, but have different representative positions.

In embodiments, sensor location module 902 may not only store multi-dimensional data points into database 906 for storage, but may also send newly acquired multi-dimensional data points to a probability determination module 908. According to embodiments of the present disclosure, probability determination module 908 may be configured to receive new multi-dimensional data point 903 (e.g., the multi-dimensional data point representing the current location of the mobile device) and determine whether the mobile device is located within a cluster of multi-dimensional data points by accessing information from database 906.

B. Probability Determination Module

Probability determination module 908 may be software code configured to receive information from sensor location module 902 and sensor location and kernel function database 906 and send information to a location predictor module 910. For instance, probability determination module 908 may receive information pertaining to clusters of multi-dimensional data points and kernel functions 907 from sensor location and kernel function database 906. This information may be used to determine one or more physical locations as discussed herein with respect to FIGS. 1 and 3A-3B.

Furthermore, probability determination module 908 may receive new multi-dimensional data point 903 from sensor location module 902. New multi-dimensional data point 903 may be used to determine the probability of the mobile device being in any one of the physical locations determined from the information (e.g., clusters of multi-dimensional data points and kernel functions 907) received from sensor location and kernel function database 906, as discussed herein with respect to FIGS. 6A-6B and 7. The determined probabilities may then be sent to location predictor module 910 as probabilities 909.

C. Location Predictor Module

Location predictor module 910 may be software code configured to receive information from probability determination module 908 to determine whether the mobile device is in any one of the identified physical locations or if the mobile device is not in any physical location at all. For instance, location predictor module 910 may apply a probability threshold to the received probabilities to determine whether the mobile device is within any of the identified physical locations. If the probability of being in one of the physical locations is greater than a probability threshold, then location predictor module 910 may determine that the mobile device is within the physical location. If, however, the probability of being in any of the physical locations is less than the probability threshold, then it may be determined that the mobile device is in the null cluster, i.e., not in any of the identified physical locations.

VII. Example Device

Figure 10:
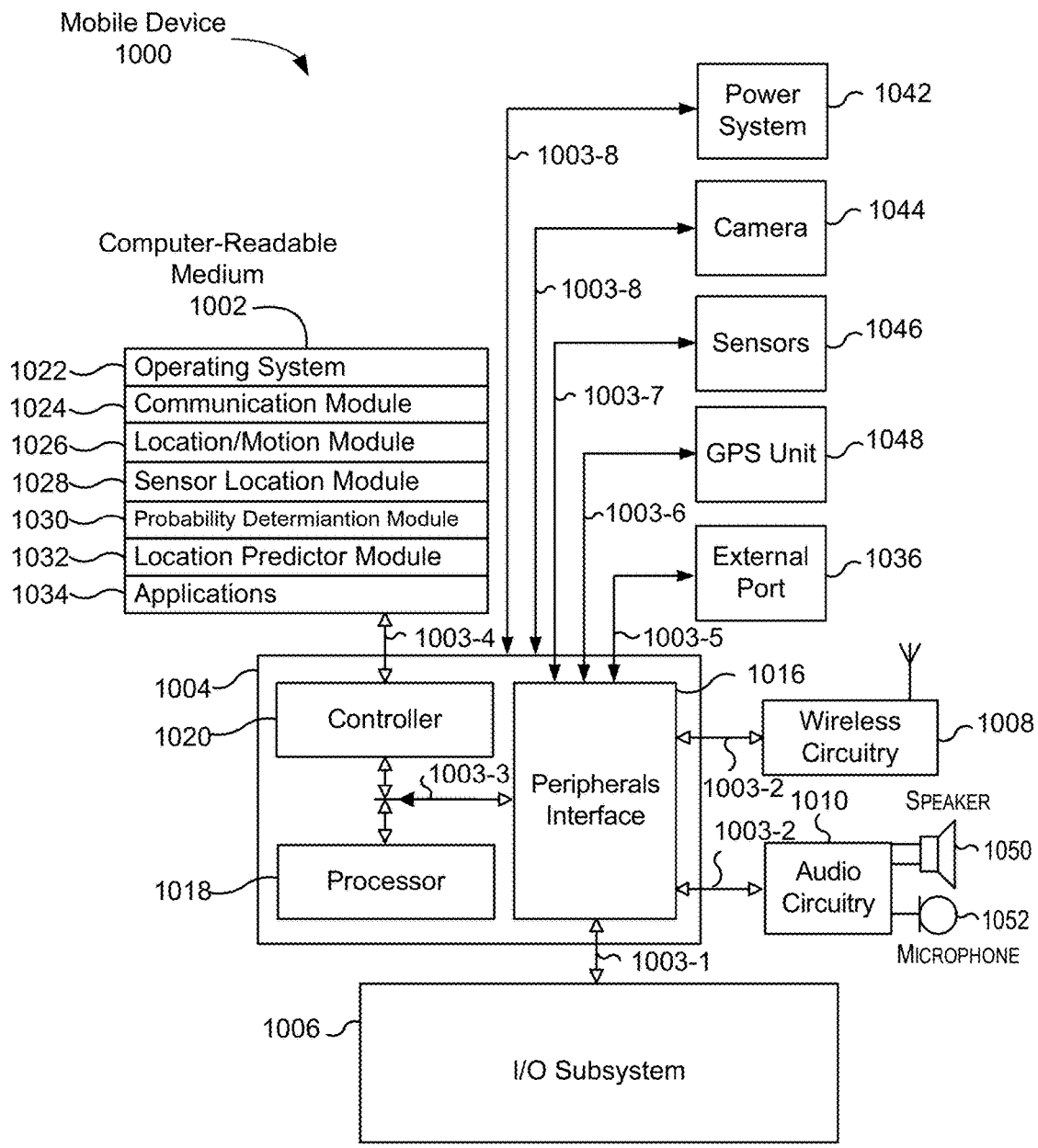
FIG. 10 is a simplified diagram for an exemplary device configured to determine location of a mobile device with respect to physical locations, according to embodiments of the present disclosure.

FIG. 10 is a block diagram of an example device 1000, which may be a mobile device. Device 1000 generally includes computer-readable medium 1002, a processing system 1004, an Input/Output (I/O) subsystem 1006, wireless circuitry 1008, and audio circuitry 1010 including speaker 1050 and microphone 1052. These components may be coupled by one or more communication buses or signal lines 1003. Device 1000 can be any portable electronic device, including a handheld computer, a tablet computer, a mobile phone, laptop computer, tablet device, media player, personal digital assistant (PDA), a key fob, a car key, an access card, a multi-function device, a mobile phone, a portable gaming device, a car display unit, or the like, including a combination of two or more of these items.

It should be apparent that the architecture shown in FIG. 10 is only one example of an architecture for device 1000, and that device 1000 can have more or fewer components than shown, or a different configuration of components. The various components shown in FIG. 10 can be implemented in hardware, software, or a combination of both hardware and software, including one or more signal processing and/or application specific integrated circuits.

Wireless circuitry 1008 is used to send and receive information over a wireless link or network to one or more other devices' conventional circuitry such as an antenna system, an RF transceiver, one or more amplifiers, a tuner, one or more oscillators, a digital signal processor, a CODEC chipset, memory, etc. Wireless circuitry 1008 can use various protocols, e.g., as described herein.

Wireless circuitry 1008 is coupled to processing system 1004 via peripherals interface 1016. Interface 1016 can include conventional components for establishing and maintaining communication between peripherals and processing system 1004. Voice and data information received by wireless circuitry 1008 (e.g., in speech recognition or voice command applications) is sent to one or more processors 1018 via peripherals interface 1016. One or more processors 1018 are configurable to process various data formats for one or more application programs 1034 stored on medium 1002.

Peripherals interface 1016 couple the input and output peripherals of the device to processor 1018 and computer-readable medium 1002. One or more processors 1018 communicate with computer-readable medium 1002 via a controller 1020. Computer-readable medium 1002 can be any device or medium that can store code and/or data for use by one or more processors 1018. Medium 1002 can include a memory hierarchy, including cache, main memory and secondary memory.

Device 1000 also includes a power system 1042 for powering the various hardware components. Power system 1042 can include a power management system, one or more power sources (e.g., battery, alternating current (AC)), a recharging system, a power failure detection circuit, a power converter or inverter, a power status indicator (e.g., a light emitting diode (LED)) and any other components typically associated with the generation, management and distribution of power in mobile devices.

In some embodiments, device 1000 includes a camera 1044. In some embodiments, device 1000 includes sensors 1046. Sensors 1046 can include accelerometers, compasses, gyrometers, pressure sensors, audio sensors, light sensors, barometers, and the like. Sensors 1046 can be used to sense location aspects, such as auditory or light signatures of a location.

In some embodiments, device 1000 can include a GPS receiver, sometimes referred to as a GPS unit 1048. A mobile device can use a satellite navigation system, such as the Global Positioning System (GPS), to obtain position information, timing information, altitude, or other navigation information. During operation, the GPS unit can receive signals from GPS satellites orbiting the Earth. The GPS unit analyzes the signals to make a transit time and distance estimation. The GPS unit can determine the current position (current location) of the mobile device. Based on these estimations, the mobile device can determine a location fix, altitude, and/or current speed. A location fix can be geographical coordinates such as latitudinal and longitudinal information.

One or more processors 1018 run various software components stored in medium 1002 to perform various functions for device 1000. In some embodiments, the software components include an operating system 1022, a communication module (or set of instructions) 1024, a location module (or set of instructions) 1026, a sensor location module 1028, a probability determination module 1030, a location predictor module 1032, and other applications (or set of instructions) 1034, such as a car locator app and a navigation app.

Operating system 1022 can be any suitable operating system, including iOS, Mac OS, Darwin, RTXC, LINUX, UNIX, OS X, WINDOWS, or an embedded operating system such as VxWorks. The operating system can include various procedures, sets of instructions, software components and/or drivers for controlling and managing general system tasks (e.g., memory management, storage device control, power management, etc.) and facilitates communication between various hardware and software components.

Communication module 1024 facilitates communication with other devices over one or more external ports 1036 or via wireless circuitry 1008 and includes various software components for handling data received from wireless circuitry 1008 and/or external port 1036. External port 1036 (e.g., USB, FireWire, Lightning connector, 60-pin connector, etc.) is adapted for coupling directly to other devices or indirectly over a network (e.g., the Internet, wireless LAN, etc.).

Location/motion module 1026 can assist in determining the current position (e.g., coordinates or other geographic location identifiers) and motion of device 1000. Modern positioning systems include satellite based positioning systems, such as Global Positioning System (GPS), cellular network positioning based on "cell IDs," and Wi-Fi positioning technology based on a Wi-Fi networks. GPS also relies on the visibility of multiple satellites to determine a position estimate, which may not be visible (or have weak signals) indoors or in "urban canyons." In some embodiments, location/motion module 1026 receives data from GPS unit 1048 and analyzes the signals to determine the current position of the mobile device. In some embodiments, location/motion module 1026 can determine a current location using Wi-Fi or cellular location technology. For example, the location of the mobile device can be estimated using knowledge of nearby cell sites and/or Wi-Fi access points with knowledge also of their locations. Information identifying the Wi-Fi or cellular transmitter is received at wireless circuitry 1008 and is passed to location/motion module 1026. In some embodiments, the location module receives the one or more transmitter IDs. In some embodiments, a sequence of transmitter IDs can be compared with a reference database (e.g., Cell ID database, Wi-Fi reference database) that maps or correlates the transmitter IDs to position coordinates of corresponding transmitters, and computes estimated position coordinates for device 1000 based on the position coordinates of the corresponding transmitters. Regardless of the specific location technology used, location/motion module 1026 receives information from which a location fix can be derived, interprets that information, and returns location information, such as geographic coordinates, latitude/longitude, or other location fix data.

Sensor location module 1028 can receive measured sensor values from one or more sensors and form a multi-dimensional data point representing a current location of a mobile device, e.g., as described herein with respect to FIG. 9. The measured sensor values may be one or more properties of a wireless signal transmitted from one or more signal sources.

Probability determination module 1030 can receive a new multi-dimensional data point representing a current location of a mobile device and receive kernel functions and information identifying clusters of multi-dimensional data points from historical usage of the mobile device to determine a probability of the mobile device being in each of the identified clusters of multi-dimensional data points, as discussed herein with respect to FIGS. 6A-6B and 8.

Location predictor module 1032 can receive probabilities of being in each of the identified clusters of multi-dimensional data points and determine whether the mobile device is located in a cluster of multi-dimensional data points or if the mobile device is located in a null cluster, e.g., not in any cluster at all.

The one or more applications programs 1034 on the mobile device can include any applications installed on the device 1000, including without limitation, a browser, address book, contact list, email, instant messaging, word processing, keyboard emulation, widgets, JAVA-enabled applications, encryption, digital rights management, voice recognition, voice replication, a music player (which plays back recorded music stored in one or more files, such as MP3 or AAC files), etc.

There may be other modules or sets of instructions (not shown), such as a graphics module, a time module, etc. For example, the graphics module can include various conventional software components for rendering, animating and displaying graphical objects (including without limitation text, web pages, icons, digital images, animations and the like) on a display surface. In another example, a timer module can be a software timer. The timer module can also be implemented in hardware. The time module can maintain various timers for any number of events.

The I/O subsystem 1006 can be coupled to a display system (not shown), which can be a touch-sensitive display. The display system displays visual output to the user in a GUI. The visual output can include text, graphics, video, and any combination thereof. Some or all of the visual output can correspond to user-interface objects. A display can use LED (light emitting diode), LCD (liquid crystal display) technology, or LPD (light emitting polymer display) technology, although other display technologies can be used in other embodiments.

In some embodiments, I/O subsystem 1006 can include a display and user input devices such as a keyboard, mouse, and/or track pad. In some embodiments, I/O subsystem 1006 can include a touch-sensitive display. A touch-sensitive display can also accept input from the user based on haptic and/or tactile contact. In some embodiments, a touch-sensitive display forms a touch-sensitive surface that accepts user input. The touch-sensitive display/surface (along with any associated modules and/or sets of instructions in medium 1002) detects contact (and any movement or release of the contact) on the touch-sensitive display and converts the detected contact into interaction with user-interface objects, such as one or more soft keys, that are displayed on the touch screen when the contact occurs. In some embodiments, a point of contact between the touch-sensitive display and the user corresponds to one or more digits of the user. The user can make contact with the touch-sensitive display using any suitable object or appendage, such as a stylus, pen, finger, and so forth. A touch-sensitive display surface can detect contact and any movement or release thereof using any suitable touch sensitivity technologies, including capacitive, resistive, infrared, and surface acoustic wave technologies, as well as other proximity sensor arrays or other elements for determining one or more points of contact with the touch-sensitive display.

Further, the I/O subsystem can be coupled to one or more other physical control devices (not shown), such as push-buttons, keys, switches, rocker buttons, dials, slider switches, sticks, LEDs, etc., for controlling or performing various functions, such as power control, speaker volume control, ring tone loudness, keyboard input, scrolling, hold, menu, screen lock, clearing and ending communications and the like. In some embodiments, in addition to the touch screen, device 1000 can include a touchpad (not shown) for activating or deactivating particular functions. In some embodiments, the touchpad is a touch-sensitive area of the device that, unlike the touch screen, does not display visual output. The touchpad can be a touch-sensitive surface that is separate from the touch-sensitive display or an extension of the touch-sensitive surface formed by the touch-sensitive display.

In some embodiments, some or all of the operations described herein can be performed using an application executing on the user's device. Circuits, logic modules, processors, and/or other components may be configured to perform various operations described herein. Those skilled in the art will appreciate that, depending on implementation, such configuration can be accomplished through design, setup, interconnection, and/or programming of the particular components and that, again depending on implementation, a configured component might or might not be reconfigurable for a different operation. For example, a programmable processor can be configured by providing suitable executable code; a dedicated logic circuit can be configured by suitably connecting logic gates and other circuit elements; and so on.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission. A suitable non-transitory computer readable medium can include random access memory (RAM), a read only memory (ROM), a magnetic medium such as a hard-drive or a floppy disk, or an optical medium, such as a compact disk (CD) or DVD (digital versatile disk), flash memory, and the like. The computer readable medium may be any combination of such storage or transmission devices.

Computer programs incorporating various features of the present disclosure may be encoded on various computer readable storage media; suitable media include magnetic disk or tape, optical storage media, such as compact disk (CD) or DVD (digital versatile disk), flash memory, and the like. Computer readable storage media encoded with the program code may be packaged with a compatible device or provided separately from other devices. In addition, program code may be encoded and transmitted via wired optical, and/or wireless networks conforming to a variety of protocols, including the Internet, thereby allowing distribution, e.g., via Internet download. Any such computer readable medium may reside on or within a single computer product (e.g. a solid state drive, a hard drive, a CD, or an entire computer system), and may be present on or within different computer products within a system or network. A computer system may include a monitor, printer, or other suitable display for providing any of the results mentioned herein to a user.

Although the disclosure has been described with respect to specific embodiments, it will be appreciated that the disclosure is intended to cover all modifications and equivalents within the scope of the following claims.

A recitation of "a", "an" or "the" is intended to mean "one or more" unless specifically indicated to the contrary. The use of "or" is intended to mean an "inclusive or," and not an "exclusive or" unless specifically indicated to the contrary. Reference to a "first" element does not necessarily require that a second element be provided. Moreover reference to a "first" or a "second" element does not limit the referenced element to a particular location unless expressly stated.

All patents, patent applications, publications, and descriptions mentioned herein are incorporated by reference in their entirety for all purposes. None is admitted to be prior art.

What is claimed is:

1. A method comprising performing, by a mobile device that has one or more sensors:
    defining a plurality of kernel functions corresponding to a plurality of clusters of usage of the mobile device at different physical positions, wherein a respective kernel function corresponding to a respective cluster is defined based on a representative data point determined by measuring sensor values of the one or more sensors at a plurality of physical positions identified as corresponding to the respective cluster based on the measured sensor values;
    measuring, using the one or more sensors, one or more first sensor values to form a first data point in a sensor space, the first data point corresponding to a first physical position of the mobile device, wherein the one or more first sensor values are determined from one or more signals emitted from one or more signal sources;
    for each respective cluster of the plurality of clusters:
        determining a first sensor distance between the first data point and the representative data point; and
        evaluating a probability of the first data point being in the respective cluster based on the first sensor distance and the corresponding kernel function, the probability dependent on a distance function that maps the first sensor distance to a first physical distance between physical positions, wherein the distance function is determined from measurements of changes in sensor values among various physical positions;
    determining whether the first physical position corresponds to one of the plurality of clusters by comparing the probabilities to a probability threshold; and
    based on a first probability for a first cluster of the plurality of clusters being above the probability threshold, determining that the mobile device is within a first physical region defined by the first cluster, thereby determining a current physical location of the mobile device.

2. The method of claim 1, wherein each of the plurality of kernel functions includes a probability distribution that varies with physical distances.

3. The method of claim 2, wherein evaluating the probability includes:
    mapping the first sensor distance to the first physical distance using the distance function; and
    determining the probability in the probability distribution that corresponds to the first physical distance.

4. The method of claim 3, wherein the probability distribution of each of the plurality of kernel functions is dependent on the representative data point of the corresponding cluster.

5. The method of claim 4, wherein the probability distribution of each of the plurality of kernel functions is centered around the representative data point.

6. The method of claim 2, wherein each of the plurality of kernel functions has a width and a decay parameter, the decay parameter representing a rate at which the probability distribution decreases with increasing physical distance from the representative data point.

7. The method of claim 1, wherein a first representative data point of the first cluster is determined from an average of data points in the first cluster.

8. The method of claim 1, further comprising calibrating the distance function by measuring sensor values across different physical positions during in-field use, and adjusting the distance function according to the measured sensor values across the physical positions during in-field use.

9. The method of claim 1, wherein the plurality of clusters includes data points formed from sensor values measured across a historical usage of the mobile device.

10. The method of claim 1, wherein the representative data point and the first data point are multi-dimensional data points.

11. The method of claim 1, further comprising:
    identifying an application associated with the current physical location; and
    performing an action with the application.

12. The method of claim 11, wherein the action includes presenting the application on a display screen of the mobile device.

13. A computer product comprising a non-transitory computer readable medium storing a plurality of instructions that when executed control a mobile device including one or more processors and one or more sensors, the instructions comprising:
    defining a plurality of kernel functions corresponding to a plurality of clusters of usage of the mobile device at different physical positions, wherein a respective kernel function corresponding to a respective cluster is defined based on a representative data point determined by measuring sensor values of the one or more sensors at a plurality of physical positions identified as corresponding to the cluster based on the measured sensor values;
    measuring, using the one or more sensors, one or more first sensor values to form a first data point in a sensor space, the first data point corresponding to a first physical position of the mobile device, wherein the one or more first sensor values are determined from one or more signals emitted from one or more signal sources;
    for each respective cluster of the plurality of clusters:

determining a first sensor distance between the first data point and the representative data point; and evaluating a probability of the first data point being in the respective cluster based on the first sensor distance and the corresponding kernel function, the probability dependent on a distance function that maps the first sensor distance to a first physical distance between physical positions, wherein the distance function is determined from measurements of changes in sensor values among various physical positions;

determining whether the first physical position corresponds to one of the plurality of clusters by comparing the probabilities to a probability threshold; and based on a first probability for a first cluster of the plurality of clusters being above the probability threshold, determining that the mobile device is within a first physical region defined by the first cluster, thereby determining a current physical location of the mobile device.

14. The computer product of claim 13, wherein each of the plurality of kernel functions includes a probability distribution that varies with physical distances.

15. The computer product of claim 14, wherein evaluating the probability includes:
mapping the first sensor distance to the first physical distance using the distance function; and
determining the probability in the probability distribution that corresponds to the first physical distance.

16. The computer product of claim 15, wherein the probability distribution of each of the plurality of kernel functions is dependent on the representative data point of the corresponding cluster.

17. The computer product of claim 14, wherein each of the plurality of kernel functions has a width and a decay parameter, the decay parameter representing a rate at which the probability distribution decreases across the physical distance away from the representative data point.

18. A mobile device comprising:
a database;
one or more sensors; and
one or more processors configured to:
define, in the database, a plurality of kernel functions corresponding to a plurality of clusters of usage of the mobile device at different physical positions, wherein a respective kernel function corresponding to a respective cluster is defined based on a representative data point determined by measuring sensor values of the one or more sensors at a plurality of physical positions identified as corresponding to the cluster based on the measured sensor values;

measure, using the one or more sensors, first sensor values to form a first data point in a sensor space, the first data point corresponding to a first physical position of the mobile device, wherein the one or more first sensor values are determined from one or more signals emitted from one or more signal sources;

for each respective cluster of the plurality of clusters:
determine a first sensor distance between the first data point and the representative data point; and
evaluate a probability of the first data point being in the respective cluster based on the first sensor distance, the probability dependent on a distance function that maps the first sensor distance to a first physical distance between physical positions, wherein the distance function is determined from measurements of changes in sensor values among various physical positions;

determine whether the first physical position corresponds to one of the plurality of clusters by comparing the probability to a probability threshold; and based on a first probability for a first cluster of the plurality of clusters being above the probability threshold, determine that the mobile device is within a first physical region defined by the first cluster, thereby determining a current physical location of the mobile device.

19. The mobile device of claim 18, wherein each of the plurality of kernel functions includes a probability distribution that varies with physical distances.

20. The mobile device of claim 19, wherein the probability distribution of each of the plurality of kernel functions is dependent on the representative data point of the corresponding cluster.

* * * * *